(12) United States Patent
Iizuka

(10) Patent No.: US 8,935,503 B2
(45) Date of Patent: Jan. 13, 2015

(54) MANAGEMENT DEVICE, STORAGE MEDIUM, AND MANAGEMENT METHOD

(75) Inventor: Fumiyuki Iizuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 107 days.

(21) Appl. No.: 13/314,457

(22) Filed: Dec. 8, 2011

(65) Prior Publication Data

US 2012/0210088 A1    Aug. 16, 2012

(30) Foreign Application Priority Data

Feb. 15, 2011    (JP) .................. 2011-030224

(51) Int. Cl.
*G06F 12/12* (2006.01)
*G06F 3/06* (2006.01)
*G06F 12/02* (2006.01)

(52) U.S. Cl.
CPC .......... *G06F 3/0608* (2013.01); *G06F 12/0238* (2013.01); *G06F 3/0652* (2013.01); *G06F 3/067* (2013.01)
USPC .......................................... 711/166; 711/161

(58) Field of Classification Search
None
See application file for complete search history.

(56) References Cited

U.S. PATENT DOCUMENTS

| | | | |
|---|---|---|---|
| 5,966,708 A | 10/1999 | Clark et al. | |
| 7,472,238 B1 * | 12/2008 | Gokhale et al. | 711/159 |
| 8,412,905 B2 * | 4/2013 | Bryant-Rich | 711/170 |
| 8,447,946 B2 * | 5/2013 | Nakatogawa | 711/165 |

FOREIGN PATENT DOCUMENTS

| | | |
|---|---|---|
| JP | 08-077332 | 3/1996 |
| JP | 8-305614 A | 11/1996 |
| JP | 09-016440 | 1/1997 |
| JP | 10-011330 | 1/1998 |
| JP | 10-124351 A | 5/1998 |
| JP | 10-301817 | 11/1998 |
| JP | 2000-148614 A | 5/2000 |
| JP | 2002-251304 A | 9/2002 |
| JP | 2005-11469 A | 1/2005 |
| JP | 2007-201819 A | 8/2007 |
| JP | 2009-10603 A | 1/2009 |
| JP | 2010-245699 A | 10/2010 |

OTHER PUBLICATIONS

Japanese Office Action mailed Jun. 3, 2014 for corresponding Japanese Patent Application 2011-030224, with English Translation, 6 pages.

* cited by examiner

*Primary Examiner* — Gary Portka
(74) *Attorney, Agent, or Firm* — Fujitsu Patent Center

(57) ABSTRACT

The management device includes a storing unit, a determining unit, and a deleting unit. The storing unit stores data in a memory unit. When a retention period the stored data reaches a retention period specified for each data type, the determining unit 22c determines whether a size of the data reaches a threshold specified for each data type. When it is determined that the size of the data reaches the threshold specified for each data type, in order to reduce the size of the data having the data type that reaches the threshold to a size smaller than the threshold, the deleting unit 22d deletes the data having the data type that reaches the threshold from the memory unit 21.

7 Claims, 26 Drawing Sheets

FIG.2

| DATE AND TIME | SERVER | CPU LOAD | IN PACKET | DATA TYPE | ... |
|---|---|---|---|---|---|
| 2010/8/10 10:00 | Web1 | 70% | 50 | PER-MINUTE DATA | ... |

FIG.3

| DATE AND TIME | SERVER | CPU LOAD | IN PACKET | DATA TYPE | ... |
|---|---|---|---|---|---|
| 2010/8/10 10:05 | AP1 | 50% | 10 | PER-HOUR DATA | ... |

FIG.4

| DATE AND TIME | SERVER | CPU LOAD | IN PACKET | DATA TYPE | ... |
|---|---|---|---|---|---|
| 2010/8/10 12:00 | DB1 | 5% | 2 | PER-DAY DATA | ... |

| SEQUENCE NUMBER | DATE AND TIME | SERVER | CPU LOAD | IN PACKET | DATA TYPE | ... |
|---|---|---|---|---|---|---|
| 1 | 2010/8/10 10:00 | Web1 | 70% | 20 | PER MINUTE | ... |
| 2 | 2010/8/10 10:00 | Web2 | 65% | 15 | PER MINUTE | ... |
| 3 | 2010/8/10 10:00 | Web3 | 10% | 1 | PER MINUTE | ... |
| 4 | 2010/8/10 10:05 | AP1 | 50% | 10 | PER HOUR | ... |
| 5 | 2010/8/10 10:10 | AP2 | 40% | 8 | PER HOUR | ... |
| 6 | 2010/8/10 10:20 | DB1 | 5% | 2 | PER DAY | ... |
| 7 | 2010/8/10 10:00 | - | - | - | IMPORTANT | ... |

FIG.20

| DATA TYPE | RETENTION PERIOD | RATIO |
|---|---|---|
| PER-DAY DATA | THREE YEARS | 1 |
| PER-HOUR DATA | ONE YEAR | 2 |
| PER-MINUTE DATA | THREE MONTHS | 2 |

21d

MANAGEMENT DEVICE, STORAGE MEDIUM, AND MANAGEMENT METHOD

CROSS-REFERENCE TO RELATED APPLICATION

This application is based upon and claims the benefit of priority of the prior Japanese Patent Application No. 2011-030224, filed on Feb. 15, 2011, the entire contents of which are incorporated herein by reference.

FIELD

The embodiments discussed herein are directed to a management device, a management program, and a management method.

BACKGROUND

There are conventionally used management devices that store measurement data on a network or store resource measurement data on server system in databases (DB) and retain the data in databases in accordance with the type of measurement data. For example, such management devices manage the retention period of the measurement data such that the measurement data accumulated every minute is retained in a database for three months or such that the measurement data accumulated every one hour is retained in a database for one year. Furthermore, such management devices manage the retention period of the measurement data such that the measurement data accumulated every day is retained in a database for three years. Furthermore, such management devices manage important measurement data such that the important measurement data is indefinitely retained in a database without setting the retention period.

When a problem occurs, network administrators or server system administrators specify the cause of the problem by checking the contents of the measurement data retained in the database. Management devices delete measurement data from a database after the retention period expires.

Patent Document 1: Japanese Laid-open Patent Publication No. 09-016440

Patent Document 2: Japanese Laid-open Patent Publication No. 08-077332

Patent Document 3: Japanese Laid-open Patent Publication No. 10-301817

Patent Document 4: Japanese Laid-open Patent Publication No. 10-011330

However, with the conventional technology described above, there is a problem in that a spare retention area, which is a free memory area, in a database is not effectively used. For example, if the retention period during which measurement data is retained in a database is previously set, there may sometimes be a case in which a spare retention area is present in a memory area in a database. In such a case, because measurement data is not retained in the spare retention area, the spare retention area is not effectively used.

In the following, a reason for needing such a spare retention area will be described. Even when the size of measurement data to be retained increases, by using another spare retention area as an area in which the measurement data is retained, the retention period of various measurement data can be more reliably reserved.

In the following, a description will be given with reference to FIG. 36 and by using examples of "per-day data", which is measurement data accumulated every day; "per-hour data", which is measurement data accumulated every one hour; "per-minute data", which is measurement data accumulated every minutes; and "important data", which is important measurement data contained in the above data.

FIG. 36 is a schematic diagram illustrating a problem with the conventional technology. In the example illustrated in FIG. 36, the "per-day data", the "per-hour data", the "per-minute data", and the "important data" are stored in a database. Furthermore, in the example illustrated in FIG. 36, the retention periods for the "per-day data", the "per-hour data", the "per-minute data", and the "important data" are three years, one year, three months, and indefinitely, respectively. FIG. 36 illustrates a case in which, if the retention periods for the "per-day data", the "per-hour data", the "per-minute data", and the "important data" are three years, one year, three months, and indefinitely, respectively, a spare retention area 91 corresponding to a free memory area is present in a memory area 90 in the database.

As described above, with the conventional technology, there is a problem in that, if the retention period of the database measurement data to be retained in the database is previously set, it is not possible to effectively use a spare retention area that is a free memory area.

Furthermore, to avoid the presence of the spare retention area, if the entire memory area in the database is allocated to areas for each measurement data and each measurement data is retained in each area, the following problem occurs due to insufficient memory area if the size of any of the measurement data becomes large.

Specifically, there may sometimes be a problem in which the measurement data is not retained for the retention period that is previously set. In the following, this problem will be specifically described. FIG. 37 is a schematic diagram illustrating a problem that occurs when the entire memory area of a database is allocated to areas for each measurement data and each of the measurement data is retained in each region.

In the example illustrated in FIG. 37, "per-day data", "per-hour data", "per-minute data", and "important data" are stored in a database. Furthermore, FIG. 37 illustrates a case, as an example, in which, to avoid the presence of the spare retention area, an entire memory area 90A in the database is allocated such that the retention periods of the "per-day data", the "per-hour data", the "per-minute data", and the "important data" are 4.5 years, 1.5 years, 4.5 months, and indefinitely, respectively. In such a case, a management device manages an operation that satisfies a predetermined operation condition, e.g., the condition that the "per-minute data" be always retained for 4.5 months, which is the retention period of the "per-minute data". As illustrated in FIG. 37, if the size of the "per-minute data" becomes large, the following problem may occur. The retention periods of the "per-day data" and the "per-hour data" become 2.4 years and 0.8 years, respectively. Accordingly, there may be a problem in that the "per-day data" and the "per-hour data" are not retained for three years and one year, respectively, that is the minimum retention period.

SUMMARY

According to an aspect of an embodiment of the invention, a management device includes a storing unit that stores data in a memory unit; a determining unit that determines, when a retention period of the data stored by the storing unit reaches a retention period specified for each data type, whether a size of the data reaches a threshold specified for each data type; and a deleting unit that deletes, when the determining unit determines that the size of the data reaches the threshold specified for each data type, in order to reduce the size of the data of the data type that reaches the threshold to a size smaller than the threshold, the data of the data type that reaches the threshold from the memory unit.

According to another aspect of an embodiment of the invention, a management device includes a processor; and a memory, wherein the processor executes storing data in the memory; determining, when a retention period of the data stored reaches a retention period specified for each data type, whether a size of the data reaches a threshold specified for each data type; and deleting, when determining that the size of the data reaches the threshold specified for each data type, in order to reduce the size of the data of the data type that reaches the threshold to a size smaller than the threshold, the data of the data type that reaches the threshold from the memory.

According to still another aspect of an embodiment of the invention, a non-transitory computer readable storage medium storing therein a management program causing a computer to execute storing data in a memory unit; determining, when a retention period of the stored data reaches a retention period specified for each data type, whether a size of the data reaches a threshold specified for each data type; and deleting, when it is determined that the size of the data reaches the threshold specified for each data type, in order to reduce the size of the data of the data type that reaches the threshold to a size smaller than the threshold, the data of the data type that reaches the threshold from the memory unit.

According to still another aspect of an embodiment of the invention, a management method executed by a computer included storing data in a memory unit; determining, when a retention period of the stored data reaches a retention period specified for each data type, whether a size of the data reaches a threshold specified for data type; and deleting, when it is determined that the size of the data reaches the threshold specified for each data type, in order to reduce the size of the data of the data type that reaches the threshold to a size smaller than the threshold, the data of the data type that reaches the threshold from the memory unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram illustrating an example of per-minute data;

FIG. 3 is a schematic diagram illustrating an example of per-hour data;

FIG. 4 is a schematic diagram illustrating an example of per-day data;

FIG. 20 is a schematic diagram illustrating an example of a setup table;

DESCRIPTION OF EMBODIMENTS

Preferred embodiments of the present invention will be explained with reference to accompanying drawings. The present invention is not limited to the embodiments. Furthermore, the embodiments can be appropriately used in combination as long as processes do not conflict with each other.

[a] First Embodiment

System Configuration

Figure 1:
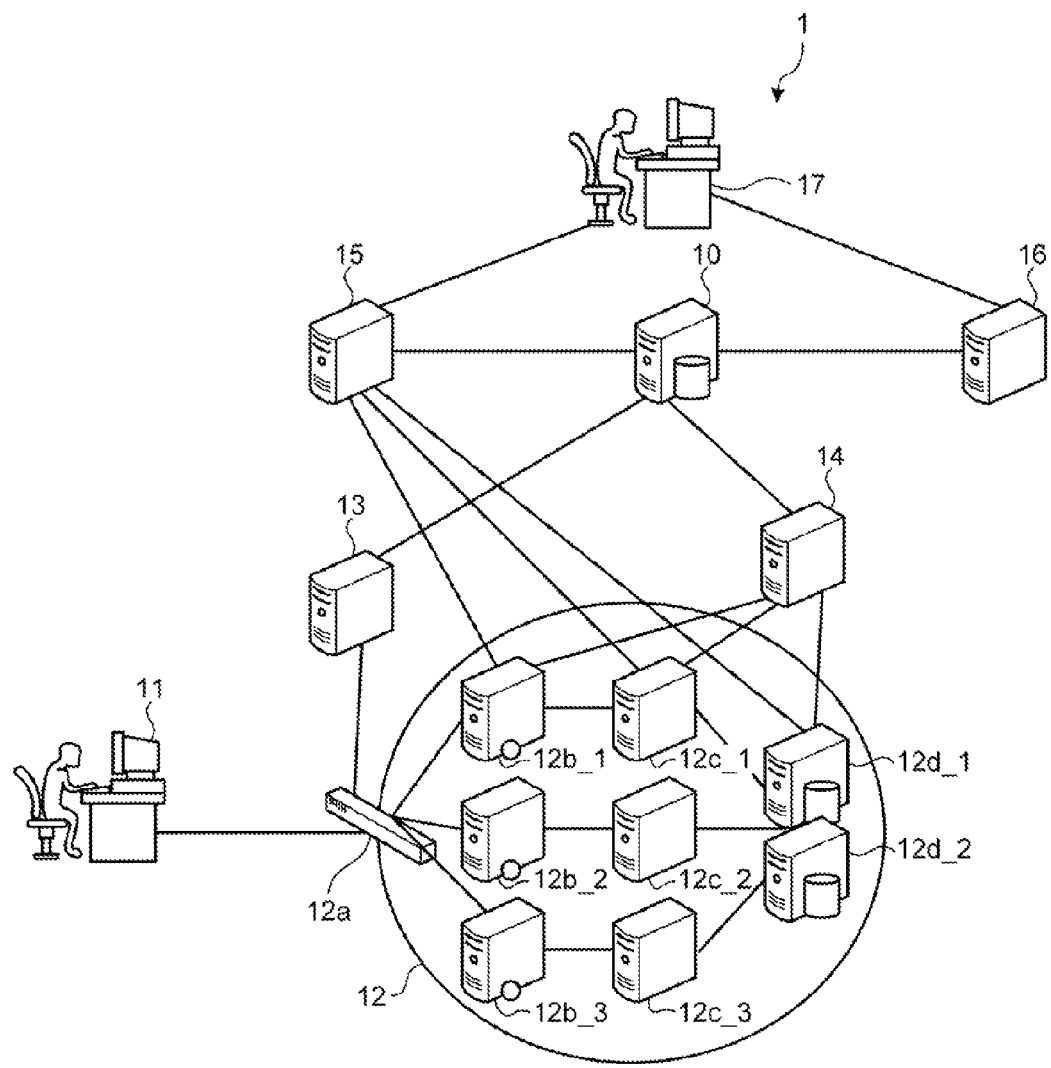
FIG. 1 is a schematic diagram illustrating an example of the overall configuration of a system used in a management device according to the first embodiment.

A management device according to a first embodiment will be described. FIG. 1 is a schematic diagram illustrating an example of the overall configuration of a system used in a management device according to the first embodiment. A management device 10 according to the first embodiment manages a retention period of data on a network and data received from a server.

As illustrated in FIG. 1, a system 1 includes the management device 10, a user terminal 11, a service system 12, a network information collecting device 13, a server information collecting device 14, an operation management device 15, a data retaining device 16, and a system administrator terminal 17.

The user terminal 11 is a terminal that is used to receive a service performed by the service system 12. The user terminal 11 includes a receiving unit that receives, from a user, an instruction to receive a service. The user terminal 11 also includes a display unit that displays a content received from the service system 12 on a Web browser. Example devices of the receiving unit includes a keyboard or a mouse that receives an instruction from a user. Example devices of the display unit includes a liquid crystal display (LCD) or a cathode ray tube (CRT) display that outputs and displays content received from the service system 12. When receiving an instruction from a user, the user terminal 11 transmits the instruction received from the user to the service system 12.

The service system 12 performs information processing in accordance with instructions from a user and transmits the result of the information processing to the user terminal 11, thus providing the user with a service conforming to the instructions from the user. The service system 12 includes a router 12a, web servers 12b_1 to 3, application (AP) servers 12c_1 to 3, and data base (DB) servers 12d_1 and 2. In the example illustrated in FIG. 1, the number of web servers, AP servers, and DB servers are three, three, and two, respectively; however, the number of each type of server is not limited thereto. Any number of servers can be used. In the descriptions below, if there is no need to distinguish between the web servers, the web servers are simply represented as a "web server 12b", indicating any one of the web servers 12b. Similarly, if there is no need to distinguish between the AP servers and the DB servers, the AP servers and the DB servers are simply represented as an "AP server 12c" and a "DB server 12d", respectively, indicating any one of the "AP servers 12c" and the "DB servers 12d", respectively.

The router 12a performs communication between the user terminal 11 and the web server 12b. Furthermore, the router 12a has what is called port mirroring function. For example, the router 12a copies data transmitted via a port connected to the web server 12b; adds, to the copied data, information indicating that the data is "important data"; and transmits it to the network information collecting device 13. By doing so, the network information collecting device 13 can collect the data transmitted on the network.

The web server 12b provide the content that is then browsed through a Web browser. For example, when receiving the result of the information processing from the AP server 12c, the web server 12b transmits, to the user terminal 11 via the router 12a, the content indicating the result of the information processing. Furthermore, when receiving an instruction from a user from the user terminal 11 via the router 12a, the web server 12b sends a request to the AP server 12c such that the information processing indicated by the instruction is performed. Furthermore, the web server 12b switches, in accordance with an instruction from the operation management device 15, the state of the web server 12b to any one of the operating state, the standby state, and the idle state.

Furthermore, the web server 12b calculates, at one minute intervals, the number of packets received in a period of one minute and an average value of the CPU load in a period of one minute and transmits the calculated measurement data as "per-minute data" to the server information collecting device 14. FIG. 2 is a schematic diagram illustrating an example of per-minute data. The example of the per-minute data illustrated in FIG. 2 indicates that the date and time at which the number of packets and the CPU load are calculated is "Aug. 10, 2010 at 10:00", that the name of the server to be measured is "Web1", that the calculated CPU load is "70%", and that the number of packets received in a period of one minute is "50".

The AP server 12c performs the information processing that is requested from the web server 12b. Furthermore, the AP server 12c transmits the result of the performed information processing to the web server 12b. Furthermore, in order to acquire needed data in accordance with the information processing requested from the web server 12b, the AP server 12c sends an access request to the DB server 12d in order to access a database. Furthermore, the AP server 12c switches, in accordance with an instruction from the operation management device 15, the state of the AP server 12c to any one of the operating state, the standby state, and the idle state.

Furthermore, the AP server 12c calculates, at one hour intervals, the number of packets received in a period of one hour and an average value of the CPU load for one hour and transmits the calculated measurement data as "per-hour data" to the server information collecting device 14. FIG. 3 is a schematic diagram illustrating an example of per-hour data. The example of the per-hour data illustrated in FIG. 3 indicates that the date and time at which the number of packets and the CPU load are calculated is "Aug. 10, 2010 at 10:05", that the name of the server to be measured is "AP1", that the calculated CPU load is "50%", and that the number of packets received in a period of one hour is "10".

When receiving a request to access the database from the AP server 12c, the DB server 12d manages access to the database. Furthermore, the DB server 12d switches, in accordance with an instruction from the operation management device 15, the state of the DB server 12d to any one of the operating state, the standby state, and the idle state.

Furthermore, the DB server 12d calculates, at one day intervals, the number of packets received in a period of one day and an average value of the CPU load for one day and transmits the calculated measurement data as "per-day data" to the server information collecting device 14. FIG. 4 is a schematic diagram illustrating an example of per-day data. The example of the per-day data illustrated in FIG. 4 indicates that the date and time at which the number of packets and the CPU load are calculated is "Aug. 10, 2010 at 12:00", that the name of the server to be measured is "DB1", that the calculated CPU load is "5%", and that the number of packet received in a period of one day is "2".

The network information collecting device 13 collects data transmitted on the network. For example, as described above, the network information collecting device 13 collects, from the router 12a, data transmitted via a port connected to the web server 12b. Furthermore, the network information collecting device 13 transmits the collected data to the management device 10. After performing a process for containing the date and time of the data transmitted to the management device 10 in the transmission data, the network information collecting device 13 transmits the data containing the date and time to the management device 10.

The server information collecting device 14 collects measurement data from a server. For example, the server information collecting device 14 collects the measurement data transmitted from the web server 12b, the AP server 12c, and the DB server 12d. Furthermore, the server information collecting device 14 transmits the collected data to the management device 10.

The operation management device 15 manages each of the servers. For example, the operation management device 15 receives a state change instruction from the system administrator terminal 17 and transmits, to the server whose state is to be changed, an instruction, in accordance with the received state change instruction, to change the state of the server to the state indicated by the state change instruction.

Figures 5, 6:
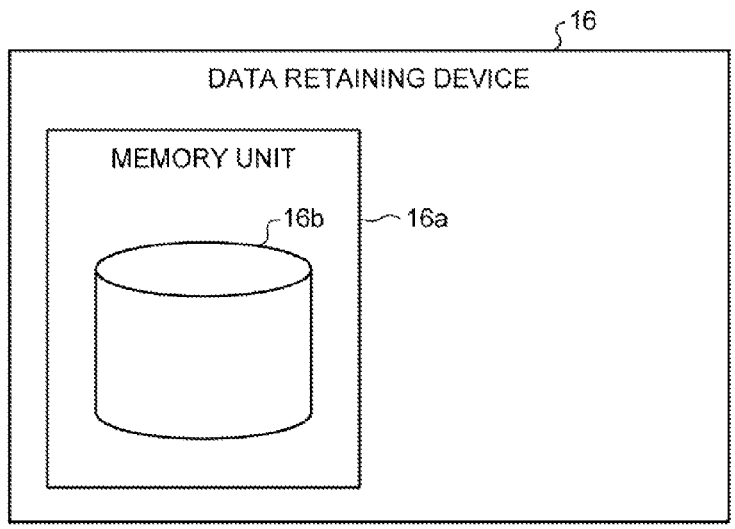
FIG. 5 is a schematic diagram illustrating an example configuration of a data retaining device according to the first embodiment.
FIG. 6 is a schematic diagram illustrating an example of data retained in a measurement data DB.

The data retaining device 16 retains various data. FIG. 5 is a schematic diagram illustrating an example configuration of a data retaining device according to the first embodiment. As illustrated in FIG. 5, the data retaining device 16 includes at least a memory unit 16a. The memory unit 16a stores therein a measurement data DB 16b. The management device 10 and the system administrator terminal 17 can access the measurement data DB 16b.

Various data is retained in the measurement data DB 16b until the size of the data reaches a threshold specified for each data type after a retention period specified for each data type has elapsed. For example, the "per-minute data" is retained in the measurement data DB 16b for three months after the day indicated by the "date and time". The "per-hour data" is retained in the measurement data DB 16b for one year after the day indicated by the "date and time". The "per-day data" is retained in the measurement data DB 16b for three years after the day indicated by the "date and time". The "important data" is indefinitely retained in the measurement data DB 16b without specifying a period.

In the measurement data DB 16b, data transmitted from the network information collecting device 13 over the network and measurement data transmitted from the server information collecting device 14 are stored by a storing unit 22a, which will be described later. If a retention period, which is specified for each data type, has elapsed and if a determining unit 22c, which will be described later, determines that the size of the data has reached its threshold, which is specified for each data type, the following process is performed on the data retained in the measurement data DB 16b. Namely, the data is deleted from the measurement data DB 16b by a deleting unit 22d, which will be described later.

In the following, an example of a method for calculating a threshold will be described. First, a value obtained by subtracting the sum of the "size of the important data", the "size of the per-minute data", the "size of the per-hour data", and the "size of the date and time data" retained in the measurement data DB 16b from the total storage capacity of the measurement data DB 16b is defined as a spare retention area. Here, when the "total storage capacity", the "size of the important data", the "size of the per-minute data", the "size of the per-hour data", the "size of the date and time data", and the "size of the spare retention area" are defined as A, B, C, D, E, and F, respectively, the following relationship is satisfied: $F=A-(B+C+D+E)$. Then, a value is calculated as a threshold by allocating the spare retention area to the "per-minute data", the "per-hour data", and the "date and time data" using a predetermined ratio. For example, if the spare retention area is allocated to the "per-minute data", the "per-hour data", and the "date and time data" with a ratio of 2:2:1, the "per-minute data" is retained in the spare retention area as follows: The "per-minute data" is retained in the spare retention area until the size of the "per-minute data" reaches $2/5$ of the spare retention area. Furthermore, the "per-hour data" is retained in the spare retention area until the size of the "per-hour data" reaches $2/5$ of the spare retention area. Furthermore, the "per-day data" is retained in the spare retention area until the size of the "per-day data" reaches $1/5$ of the spare retention area. A system designer or the like can set the ratio in accordance with the importance of the data type such that more important data is retained for a longer period. For example, a system designer or the like can set a higher ratio as the importance of the data increases.

In this way, the entire memory area of the measurement data DB 16b is used to retain various data. Accordingly, when retaining the various data, a spare retention area is also used. As described above, in the first embodiment, the spare retention area is also effectively used.

FIG. 6 is a schematic diagram illustrating an example of data retained in a measurement data DB. The example illustrated in FIG. 6 indicates that data containing the date and time at which the number of packets and the CPU load are calculated is "Aug. 10, 2010 at 10:00" and whose data type is the "per-minute data" is retained in a record represented by a sequence number "1" in the measurement data DB 16b. Furthermore, the example illustrated in FIG. 6 indicates that, in the record represented by the sequence number "1" in the measurement data DB 16b, the "per-minute data" indicating that the CPU load calculated by the server "Web1" is "70%" and that the number of packets received in a period of one minute is "20" is retained.

Furthermore, the example illustrated in FIG. 6 indicates that data containing the date and time at which the number of packets and the CPU load are calculated is "Aug. 10, 2010 at 10:00" and whose data type is the "per-minute data" is retained in a record represented by a sequence number "2" in the measurement data DB 16b. Furthermore, the example illustrated in FIG. 6 indicates that, in the record represented by the sequence number "2" in the measurement data DB 16b, the "per-minute data" indicating that the CPU load calculated by the server "Web2" is "65%" and indicates that the number of packets received in a day is "15" is retained.

Furthermore, the example illustrated in FIG. 6 indicates that data containing the date and time at which the number of packets and the CPU load are calculated is "Aug. 10, 2010 at 10:00" and whose data type is the "per-minute data" is retained in a record represented by a sequence number "3" in the measurement data DB 16b. Furthermore, the example illustrated in FIG. 6 indicates that, in the record represented by the sequence number "3" in the measurement data DB 16b, the "per-minute data" indicating that the CPU load calculated by the server "Web3" is "10%" and indicates that the number of packets received in a period of one day is "1" is retained.

Furthermore, the example illustrated in FIG. 6 indicates that data containing the date and time at which the number of packets and the CPU load are calculated is "Aug. 10, 2010 at 10:05" and whose data type is the "per-hour data" is retained in a record represented by a sequence number "4" in the measurement data DB 16b. Furthermore, the example illustrated in FIG. 6 indicates that, in the record represented by the sequence number "4" in the measurement data DB 16b, the "per-hour data" indicating that the CPU load calculated by the server "AP1" is "50%" and indicates that the number of packets received in a period of one day is "10" is retained.

Furthermore, the example illustrated in FIG. 6 indicates that data containing the date and time at which the number of packets and the CPU load are calculated is "Aug. 10, 2010 at 10:10" and whose data type is "per-hour data" is retained in a record represented by a sequence number "5" in the measurement data DB 16b. Furthermore, the example illustrated in FIG. 6 indicates that, in the record represented by the sequence number "5" in the measurement data DB 16b, the "per-hour data" indicating that the CPU load calculated by the server "AP2" is "40%" and indicates that the number of packets received in a period of one day is "8" is retained.

Furthermore, the example illustrated in FIG. 6 indicates that data containing the date and time at which the number of packets and the CPU load are calculated is "Aug. 10, 2010 at 10:20" and whose data type is "per-day data" is retained in a record represented by a sequence number "6" in the measurement data DB 16b. Furthermore, the example illustrated in FIG. 6 indicates that, in the record represented by the sequence number "6" in the measurement data DB 16b, the "per-day data" indicating that the CPU load calculated by the server "DB1" is "5%" and indicates that the number of packets received in a period of one day is "2" is retained.

Furthermore, the example illustrated in FIG. 6 indicates that data containing the date and time at which the data is transmitted is "Aug. 10, 2010 at 10:00" and whose data type is the "important data" is retained in a record represented by a sequence number "7" in the measurement data DB 16b. Furthermore, although not illustrated in FIG. 6, the "important data" retained in the record represented by the sequence number "7" includes information, such as an IP address of the transmission source of the data, a destination IP address for the data, and the content of a request, which are used to specify the occurrence of a problem.

The system administrator terminal 17 manages the state of each server in the service system 12. If a receiving unit, which will be described later, receives an instruction to display the content of data retained in the measurement data DB 16b, the system administrator terminal 17 accesses the measurement data DB 16b in the data retaining device 16 and displays the content of the data on a display unit, which will be described later. By doing so, the system administrator terminal 17 allows a system administrator to monitor the communication state of the network in the service system 12 and the operation state of each server. The system administrator terminal 17 includes the receiving unit that receives an instruction from a system administrator who manages the service system 12 and also includes the display unit that displays the content of data in the measurement data DB 16b. Examples of the receiving unit include a keyboard or a mouse that receives instructions from the system administrator. Examples of the display unit include an LCD or a CRT display that outputs and displays data contained in the measurement data DB 16b. When receiving a state change instruction that changes the state of a server from a system administrator, the system administrator terminal 17 transmits the received state change instruction to the operation management device 15.

Configuration of the Management Device

Figure 7:
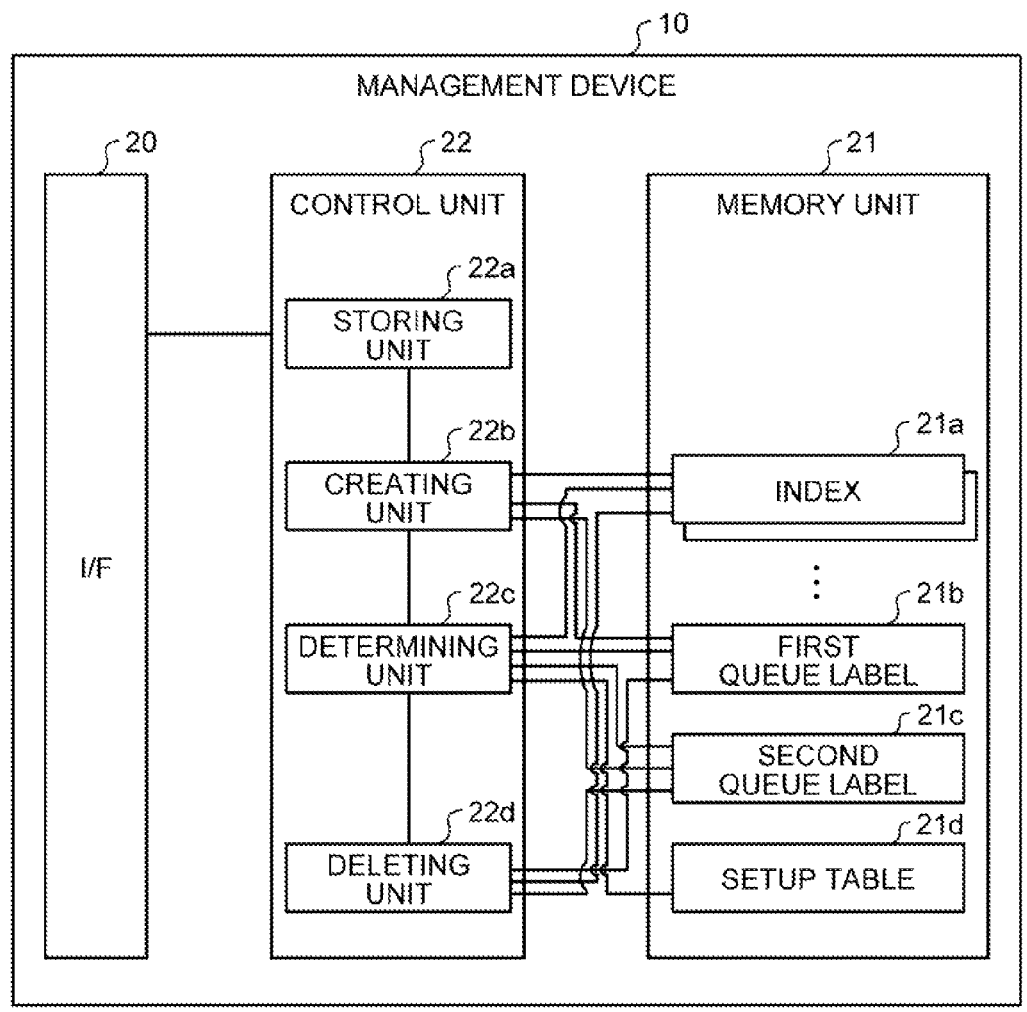
FIG. 7 is a block diagram illustrating the configuration of a management device according to the first embodiment.

The management device 10 is a device that manages a retention period of data on a network and data transmitted from a server in the service system 12. FIG. 7 is a block diagram illustrating the configuration of a management device according to the first embodiment. As illustrated in FIG. 7, the management device 10 includes an interface (I/F) 20, a memory unit 21, and a control unit 22.

The I/F 20 performs communication between devices. The network information collecting device 13, the server information collecting device 14, the operation management device 15, the data retaining device 16, and the system administrator terminal 17 are connected to the I/F 20. Furthermore, the control unit 22 is connected to the I/F 20. Accordingly, data communication is available between devices, for example, the control unit 22 and each of the network information collecting device 13, the server information collecting device 14, the operation management device 15, the data retaining device 16, and the system administrator terminal 17.

The memory unit 21 stores therein various programs, such as an operating system (OS) or data needed to execute the programs, that are executed by the control unit 22. Indexes 21a created by a creating unit 22b, which will be described later, are stored in the memory unit 21. Furthermore, the memory unit 21 stores therein a first queue label 21b for each data type, a second queue label 21c for each data type, and a setup table 21d. A queue, which will be described below, is virtually implemented by the index 21a, the first queue label 21b, and the second queue label 21c.

The indexes 21a are created for each data received by the I/F 20 from the network information collecting device 13 and the server information collecting device 14 and are used to manage data retained in the measurement data DB 16b. Furthermore, the first queue label 21b indicates various kinds of information on a virtual queue in which various data is retained in accordance with a retention period specified for each data type. Furthermore, the second queue label 21c indicates various kinds of information on a virtual queue in which various data is retained in a threshold until the size of data reaches the size specified for each data type.

FIGS. 8 to 13 are schematic diagrams each illustrating an example of an index and a first queue label. As illustrated in FIGS. 8 to 13, the index 21a includes a "type" that indicates the data type of the associated data. Furthermore, from among indexes 21a having the same data type, the index 21a includes a "previous index" that indicates an address, which is stored in a memory area in the memory unit 21, of an immediately previous index 21a having the immediately previous "date and time" to the index 21a. Furthermore, from among indexes 21a having the same data type, the index 21a also includes a "subsequent index" that indicates an address, which is stored in a memory area in the memory unit 21, of the immediately subsequent index 21a having the immediately subsequent "date and time" to the index 21a. Furthermore, the index 21a includes the "date and time" that indicates the date at which a CPU containing data is calculated or indicates the transmission date of the data. Furthermore, the index 21a includes the "data size" indicating the size of the associated data. Furthermore, the index 21a includes "DB storing information" indicating a sequence number of data associated with the index 21a in the measurement data DB 16b.

As illustrated in FIGS. 8 to 13, the first queue label 21b includes a "queue name" indicating the name of a queue that retains various data in accordance with a retention period specified for each data type. Furthermore, the first queue label 21b also includes a "queue type" indicating that a queue indicated by the first queue label 21b is a queue for retaining various data in accordance with a retention period specified (period retention) for each data type and indicating the type of data managed via the queue. Furthermore, the first queue label 21b includes a "top index" that indicates an address, which is stored in a memory area in the memory unit 21, of the index 21a of the top data in the queue. The top data in the queue mentioned here indicates, from among data contained in the queue, the oldest data having the oldest "date and time". Furthermore, the first queue label 21b includes a "last index" that indicates an address, which is stored in a memory area in the memory unit 21, of the index 21a of the last data in the queue. The last data in the queue mentioned here indicates, from among data contained in the queue, the latest data having the latest "date and time". Furthermore, the first queue label 21b includes a "queue length (size)" that indicates the sum of the size of the data contained in the queue indicated by the first queue label 21b that is retained in the measurement data DB 16b.

Figure 8:
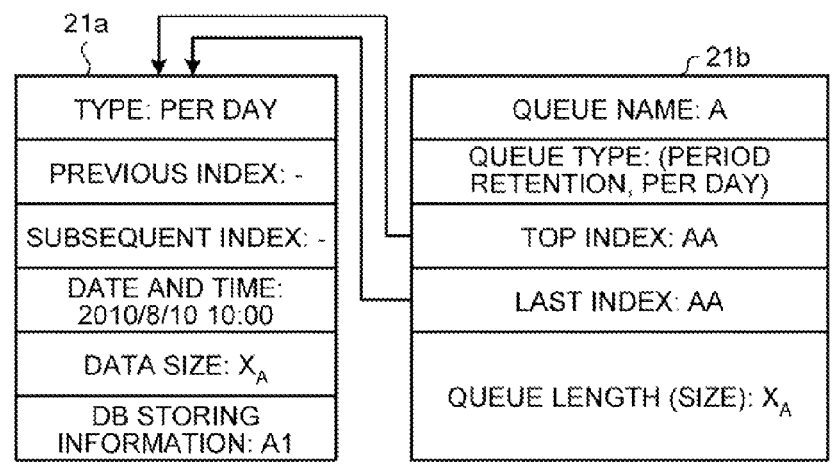
FIG. 8 is a schematic diagram illustrating an example of an index and a first queue label.

The example of the index 21a illustrated in FIG. 8 indicates that the data type is the "per-day data". Furthermore, the example of the index 21a illustrated in FIG. 8 indicates that the previous and the subsequent indexes 21a are not present. This is because, in the example illustrated in FIG. 8, the number of indexes 21a is one. Furthermore, the example of the index 21a illustrated in FIG. 8 indicates that the date and time associated with the data is Aug. 10, 2010 at 10:00. Furthermore, the example of the index 21a illustrated in FIG. 8 indicates that the size of the associated data is $X_A$. Furthermore, the example of the index 21a illustrated in FIG. 8 indicates that the sequence number of the measurement data DB 16b, in which associated data is retained, is A1.

Furthermore, the example of the first queue label 21b illustrated in FIG. 8 indicates that the name of the queue indicated by the first queue label 21b is A. Furthermore, the example of the first queue label 21b illustrated in FIG. 8 indicates that the queue indicated by the first queue label 21b is a queue that is used to retain various data in accordance with a retention period specified for each data type and indicates that the type of data managed via the queue is the "per-day data". Furthermore, the example of the first queue label 21b illustrated in FIG. 8 indicates that an address of the top data contained in the queue is AA and indicates that an address of the last data contained in the queue is also AA. In the example illustrated in FIG. 8, the reason for having the same address for the top data and the last data contained in the queue is that the number of indexes 21a is one and the index 21a of the top data is the same as that of the last data contained in the queue. Furthermore, the example of the first queue label 21b illustrated in FIG. 8 indicates that the data contained in the queue indicated by the first queue label 21b, i.e., the sum of the size of the data retained in the "per-day data" in the measurement data DB 16b, is $X_A$.

Figure 9:
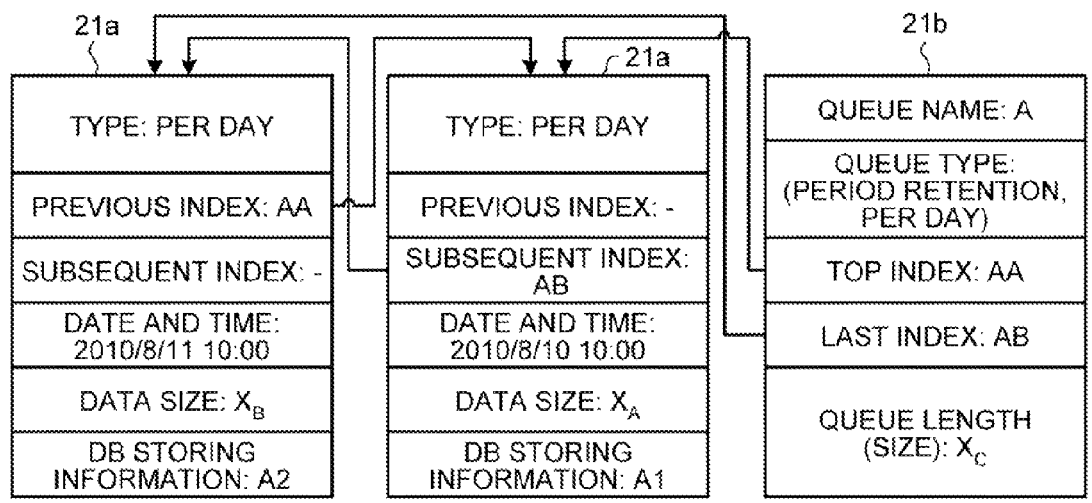
FIG. 9 is a schematic diagram illustrating an example of the index and the first queue label.

In the example of the index 21a illustrated in FIG. 9, a new index 21a is added to the example of the index 21a illustrated in FIG. 8. The newly added index 21a illustrated on the left side of FIG. 9 will be described first and then the index 21a illustrated on the right side of FIG. 9 will be described. The example of the index 21a illustrated on the left side of FIG. 9 indicates that the data type of the associated data is the "per-day data"; that an address of the previous index 21a is AA; that the date and time of the associated data is Aug. 11, 2010 at 10:00; that the size of the data of the associated data is $X_B$; and that a sequence number of the associated data retained in the measurement data DB 16b is A2.

Furthermore, the example of the index 21a illustrated on the right side of FIG. 9 indicates that an address of the subsequent index 21a is AB. Other items of the index 21a illustrated in FIG. 9 are the same as those described above with reference to FIG. 8.

Furthermore, the example of the first queue label 21b illustrated in FIG. 9 indicates that an address of the top data contained in the queue indicated by the first queue label 21b is AA; that an address of the last data contained in the queue is AB; and that the data contained in the queue indicated by the example of the first queue label 21b, i.e., the sum of the size of the data of the "per-day data" retained in the measurement data DB 16b, is $X_C$. Here, in the example illustrated in FIG. 9, $X_C = X_A + X_B$.

Figure 10:
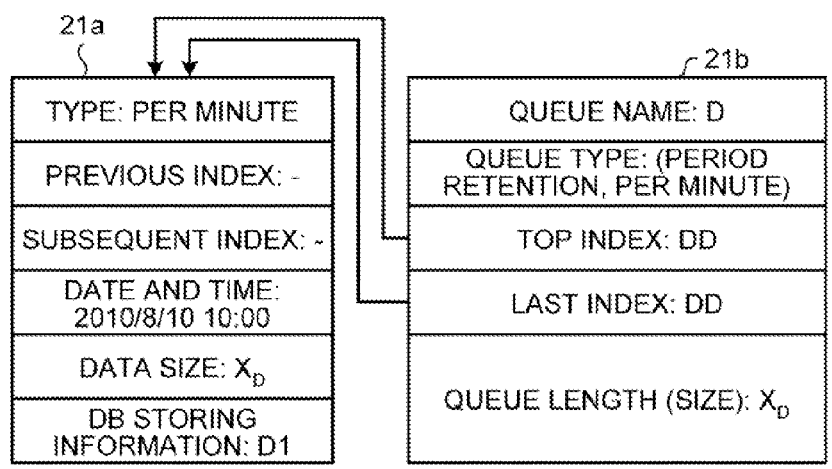
FIG. 10 is a schematic diagram illustrating an example of the index and the first queue label.

The example of the index 21a illustrated in FIG. 10 indicates that the data type is the "per-minute data". Furthermore, the example of the index 21a illustrated in FIG. 10 indicates that the previous and the subsequent indexes 21a are not present. Furthermore, the example of the index 21a illustrated in FIG. 10 indicates that the date and time of the associated data is Aug. 10, 2010 at 10:00. Furthermore, the example of the index 21a illustrated in FIG. 10 indicates that the size of the associated data is $X_D$. Furthermore, the example of the index 21a illustrated in FIG. 10 indicates that the sequence number of the measurement data DB 16b, in which the associated data is retained, is D1.

Furthermore, the example of the first queue label 21b illustrated in FIG. 10 indicates that the name of the queue is D. Furthermore, the example of the first queue label 21b illustrated in FIG. 10 indicates that the queue indicated by the first queue label 21b is a queue that is used to retain various data in accordance with a retention period specified for each data type and indicates that the type of data managed via the queue is the "per-minute data". Furthermore, the example of the first queue label 21b illustrated in FIG. 10 indicates that an address of the top data contained in the queue indicated by the first queue label 21b is DD and indicates that an address of the last data contained in the queue is also DD. Furthermore, the example of the first queue label 21b illustrated in FIG. 10 indicates that the data contained in the queue indicated by the first queue label 21b, i.e., the sum of the size of the "per-minute data" retained in the measurement data DB 16b, is $X_D$.

Figure 11:
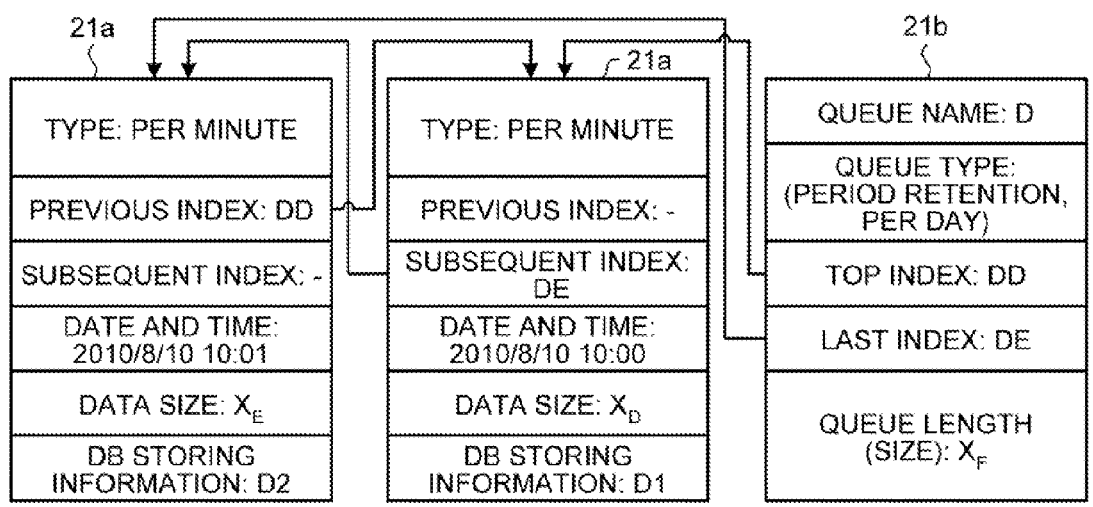
FIG. 11 is a schematic diagram illustrating an example of the index and the first queue label.

In the example of the index 21a illustrated in FIG. 11, a new index 21a is added to the example of the index 21a illustrated in FIG. 10. The newly added index 21a illustrated on the left side of FIG. 11 will be described first and then the index 21a illustrated on the right side of FIG. 11 will be described. The example of the index 21a illustrated on the left side of FIG. 11 indicates that the data type of the associated data is the "per-minute data"; that an address of the previous index 21a is DD; that the date and time of the associated data is Aug. 10, 2010 at 10:01; that the size of the data of the associated data is $X_E$; and that a sequence number of the associated data retained in the measurement data DB 16b is D2.

Furthermore, the example of the index 21a illustrated on the right side of FIG. 11 indicates that an address of the subsequent index 21a is DE. Other items of the index 21a illustrated in FIG. 11 are the same as those described in the examples illustrated in FIG. 10.

Furthermore, the example of the first queue label 21b illustrated in FIG. 11 indicates that an address of the top data contained in the queue is DD; that an address of the last data contained in the queue is DE; that the data contained in the queue, i.e., the sum of the size of the per-minute data retained in the measurement data DB 16b is $X_F$. Here, in the example illustrated in FIG. 11, $X_F = X_D + X_E$.

Figure 12:
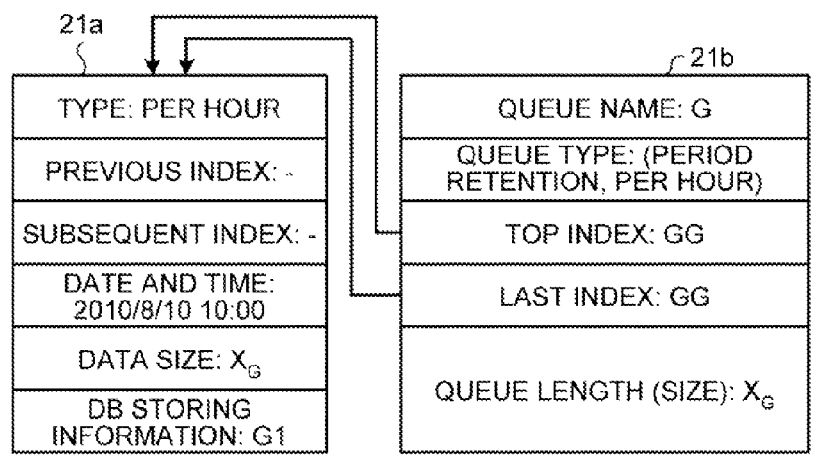
FIG. 12 is a schematic diagram illustrating an example of the index and the first queue label.

The example of the index 21a illustrated in FIG. 12 indicates that the data type is the "per-hour data". Furthermore, the example of the index 21a illustrated in FIG. 12 indicates that the previous and the subsequent indexes 21a are not present. Furthermore, the example of the index 21a illustrated in FIG. 12 indicates that the date and time of the associated data is Aug. 10, 2010 at 10:00. Furthermore, the example of the index 21a illustrated in FIG. 12 indicates that the size of the associated data is $X_G$. Furthermore, the example of the index 21a illustrated in FIG. 12 indicates that the sequence number of the measurement data DB 16b, in which the associated data is retained, is G1.

The example of the first queue label 21b illustrated in FIG. 12 indicates that the name of the queue indicated by the first queue label 21b is G. Furthermore, the example of the first queue label 21b illustrated in FIG. 12 indicates that the queue indicated by the first queue label 21b is a queue that is used to retain various data in accordance with a retention period for each data type and indicates that the type of data managed via the queue is the "per-hour data". Furthermore, the example of the first queue label 21b illustrated in FIG. 12 indicates that an address of the top data contained in the queue indicated by the first queue label 21b is GG and indicates that an address of the last data contained in the queue is also GG. Furthermore, the example of the first queue label 21b illustrated in FIG. 12 indicates that the data contained in the queue indicated by the first queue label 21b, i.e., the sum of the size of the data retained in the "per-hour data" in the measurement data DB 16b is $X_G$.

Figure 13:
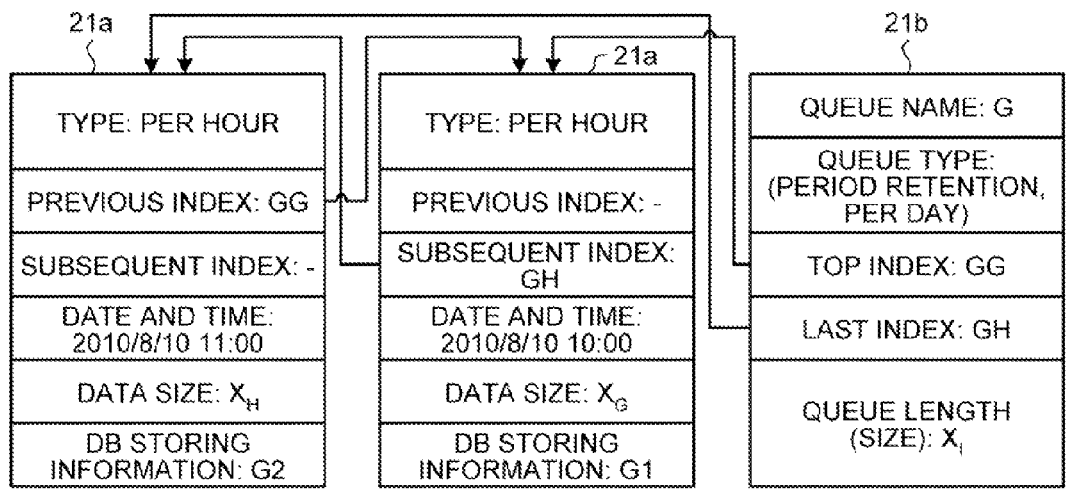
FIG. 13 is a schematic diagram illustrating an example of the index and the first queue label.

In the example of the index 21a illustrated in FIG. 13, a new index 21a is added to the example of the index 21a illustrated in FIG. 12. The newly added index 21a illustrated on the left side of FIG. 13 will be described first and then the index 21a illustrated on the right side of FIG. 13 will be described. The example of the index 21a illustrated on the left side of FIG. 13 indicates that the data type of the associated data is the "per-hour data"; that an address of the previous index 21a is GG; that the date and time of the associated data is Aug. 10, 2010 at 11:00; that the size of the data of the associated data is $X_H$; and that a sequence number of the associated data retained in the measurement data DB 16b is G2.

Furthermore, the example of the index 21a illustrated on the right side of FIG. 13 indicates that an address of the subsequent index 21a is GH. Other items of the index 21a illustrated in FIG. 13 are the same as those described in the example illustrated in FIG. 12.

Furthermore, the example of the first queue label 21b illustrated in FIG. 13 indicates that an address of the top data contained in the queue indicated by the first queue label 21b is GG; that an address of the last data contained in the queue is GH; and that the data contained in the queue indicated by the first queue label 21b, i.e., the sum of the size of the "per-hour data" retained in the measurement data DB 16b is $X_I$. Here, in the example illustrated in FIG. 13, $X_I = X_G + X_H$.

By using the indexes 21a and the first queue label 21b described above, each of the indexes 21a is virtually stored in each of the virtual queues for each data type. The index 21a is extracted from a queue indicated by the first queue label 21b when a retention period has elapsed after the "date and time" indicated by the index 21a, which will be described later.

FIGS. 14 to 19 are a schematic diagrams each illustrating an example of the second queue label. As illustrated in FIGS. 14 to 19, the second queue label 21c includes a "queue name" indicating the name of a queue that retains various data until the size of the data reaches a threshold that is specified for each data type. Furthermore, the second queue label 21c also includes a "queue type" indicating that a queue indicated by the second queue label 21c is a queue for retaining various data in accordance with a threshold specified for each data type (size) and indicating that the type of data managed via the queue. Furthermore, the second queue label 21c includes a "top index" that indicates an address in which the index 21a of the top data in the queue indicated by the second queue label 21c is stored in a memory area in the memory unit 21. Furthermore, the second queue label 21c includes a "last index" that indicates an address in which the index 21a of the last data in the queue indicated by the second queue label 21c is stored in a memory area in the memory unit 21. Furthermore, the second queue label 21c includes a "queue length (size)" that indicates the sum of the size of the data contained in the queue indicated by the second queue label 21c.

Figure 14:
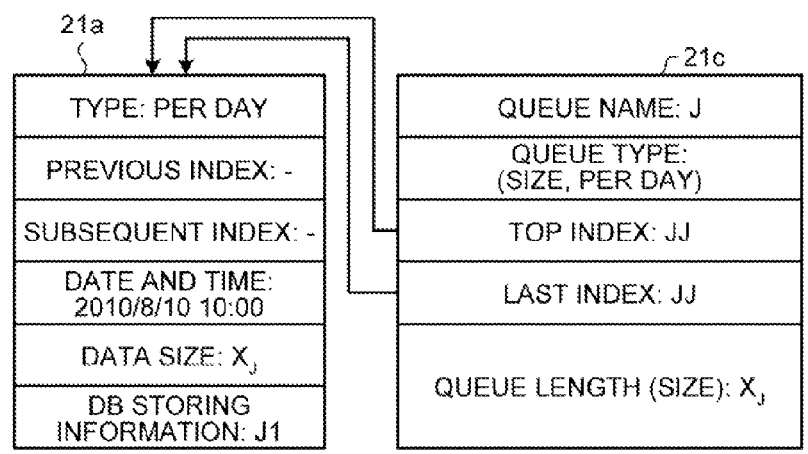
FIG. 14 is a schematic diagram illustrating an example of a second queue label.

The example of the second queue label 21c illustrated in FIG. 14 indicates that the name of the queue indicated by the second queue label 21c is J. Furthermore, the example of the second queue label 21c illustrated in FIG. 14 indicates that the queue indicated by the second queue label 21c is a queue that is used to retain various data in accordance with a threshold for each data type and indicates that the type of data managed via the queue is the "per-day data". Furthermore, the example of the second queue label 21c illustrated in FIG. 14 indicates that an address of the top data contained in the queue is JJ and indicates that an address of the last data contained in the queue is also JJ. Furthermore, the example of the second queue label 21c illustrated in FIG. 14 indicates that the data contained in the queue, i.e., the sum of the size of the data retained in the "per-day data" in the measurement data DB 16b, is $X_J$.

Figure 15:
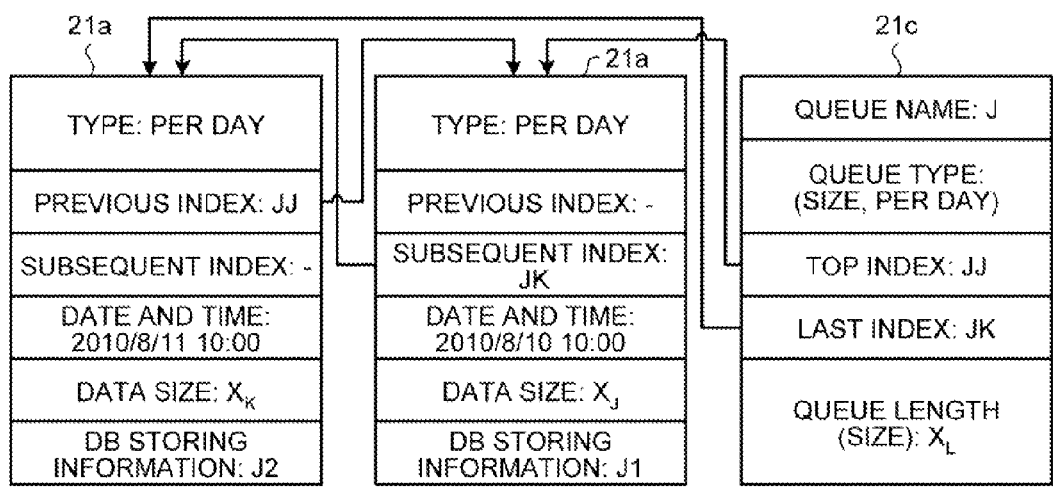
FIG. 15 is a schematic diagram illustrating an example of the second queue label.

The example of the second queue label 21c illustrated in FIG. 15 indicates that an address of the top data contained in the queue is JJ and indicate that an address of the last data in the queue is JK. Furthermore, the example of the second queue label 21c illustrated in FIG. 15 indicates that the data contained in the queue, i.e., the sum of the size of the "per-day data" retained in the measurement data DB 16b is $X_L$. Here, in the example illustrated in FIG. 15, $X_L = X_J + X_K$.

Figure 16:
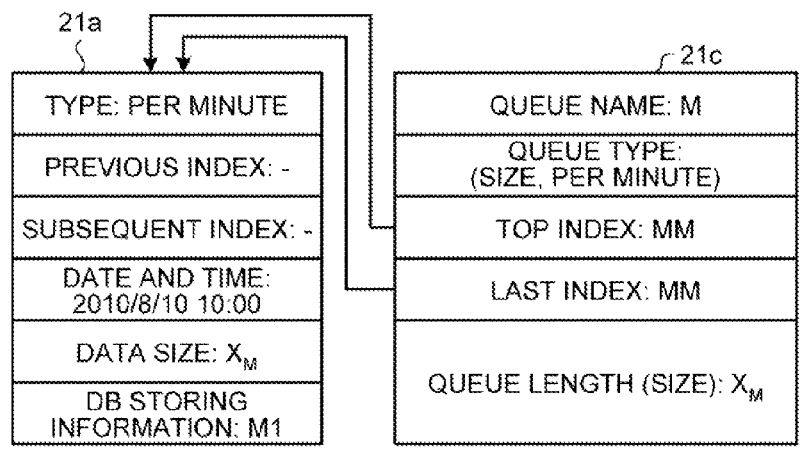
FIG. 16 is a schematic diagram illustrating an example of the second queue label.

The example of the second queue label 21c illustrated in FIG. 16 indicates that the name of the queue is M and indicates that the queue indicated by the second queue label 21c is a queue that is used to retain various data in accordance with a threshold specified for each data type and indicates that the type of data managed via the queue is the "per-minute data". Furthermore, the example of the second queue label 21c illustrated in FIG. 16 indicates that an address of the top data contained in the queue is MM and indicates that an address of the last data contained in the queue is also MM. Furthermore, the example of the second queue label 21c illustrated in FIG. 16 indicates that the data contained in the queue, i.e., the sum of the size of the "per-minute data" retained in the measurement data DB 16b is $X_M$.

Figure 17:
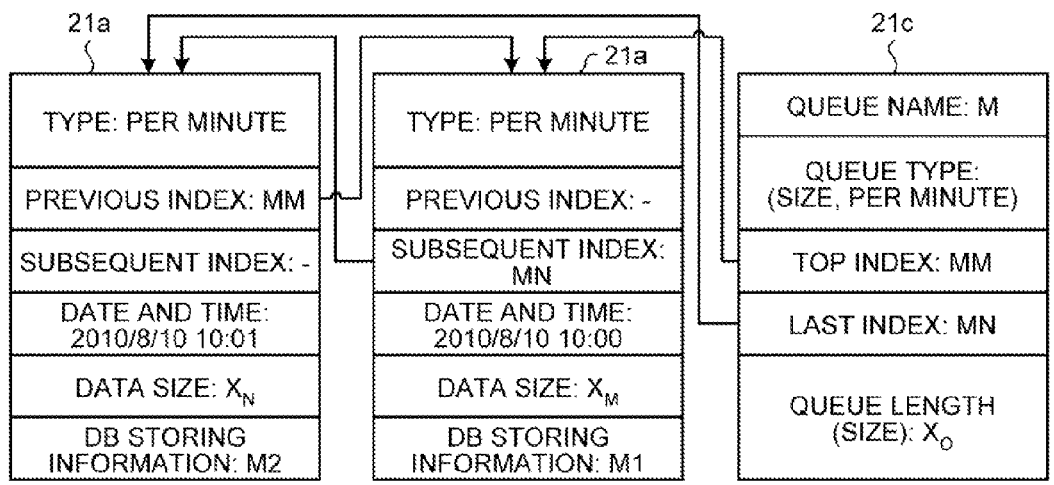
FIG. 17 is a schematic diagram illustrating an example of the second queue label.

The example of the second queue label 21c illustrated in FIG. 17 indicates that an address of the top data contained in the queue is MM and indicates that an address of the last data contained in the queue is MN. Furthermore, the example of the second queue label 21c illustrated in FIG. 17 indicates that the data contained in the queue, i.e., the sum of the size of the "per-minute data" retained in the measurement data DB 16b is $X_O$. Here, in the example illustrated in FIG. 17, $X_O = X_M + X_N$.

Figure 18:
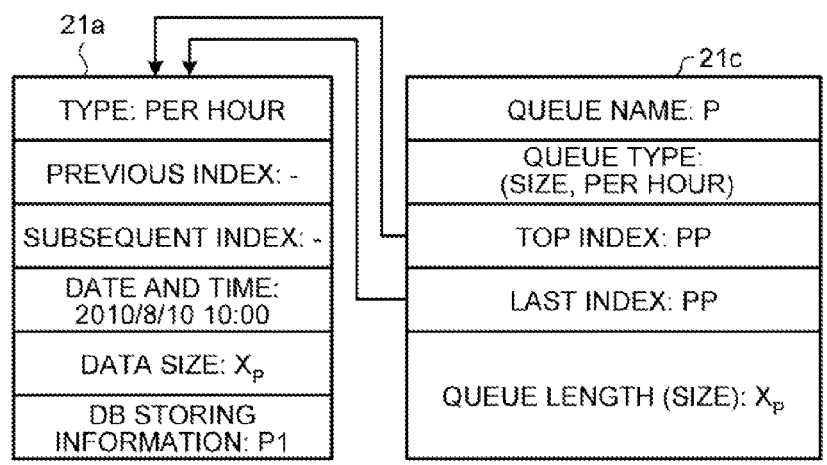
FIG. 18 is a schematic diagram illustrating an example of the second queue label.

The example of the second queue label 21c illustrated in FIG. 18 indicates that the name of the queue is P and indicates that the queue indicated by the second queue label 21c is a queue that is used to retain various data in accordance with a threshold specified for each data type and indicates that the type of data managed via the queue is the "per-hour data". Furthermore, the example of the second queue label 21c illustrated in FIG. 18 indicates that an address of the top data contained in the queue is PP and an address of the last data contained in the queue is also PP. Furthermore, the example of the second queue label 21c illustrated in FIG. 18 indicates that the data contained in the queue, i.e., the sum of the size of the "per-hour data" retained in the measurement data DB 16b, is $X_P$.

Figure 19:
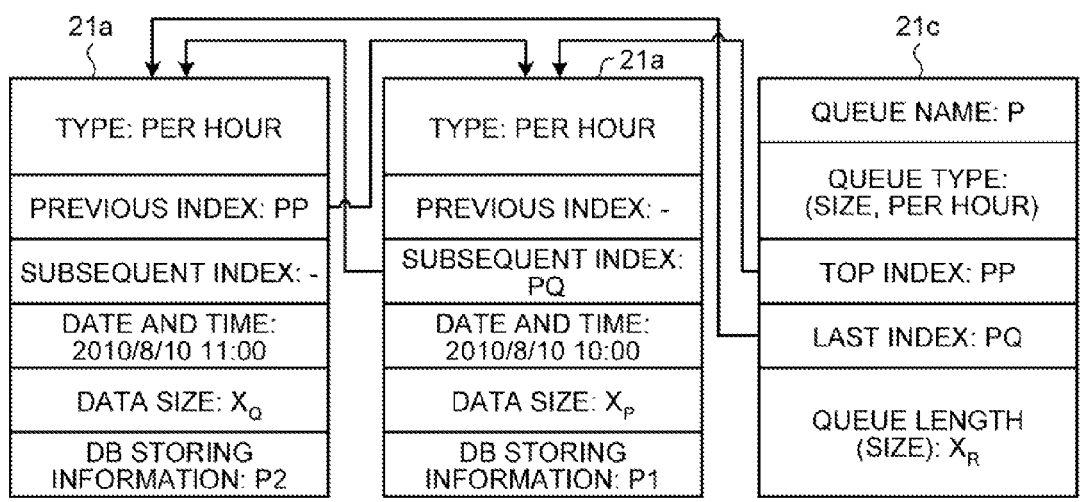
FIG. 19 is a schematic diagram illustrating an example of the second queue label.

The example of the second queue label 21c illustrated in FIG. 19 indicates that an address of the top data contained in the queue is PP and an address of the last data contained in the queue is PQ. The example of the second queue label 21c illustrated in FIG. 19 indicates that the data contained in the queue, i.e., the sum of the size of the "per-hour data" retained in the measurement data DB 16b is $X_R$. Here, in the example illustrated in FIG. 19, $X_R=X_P+X_Q$.

By using the indexes 21a and the second queue label 21c described above, each of the indexes 21a is virtually stored in each of the virtual queues for each data type. The index 21a is virtually extracted from a queue indicated by the second queue label 21c when the size of the data whose data type is associated with the index 21a reaches the associated threshold, which will be described later.

In the setup table 21d, retention periods of various data are set and ratios used when calculating thresholds of various data are set. FIG. 20 is a schematic diagram illustrating an example of a setup table. In the example illustrated in FIG. 20, a retention period of the "per-day data" is three years; a retention period of the "per-hour data" is one year; and a retention period of the "per-minute data" is three months.

Furthermore, the example illustrated in FIG. 20 indicates a case in which the ratio of the spare retention area allocated to the "per-minute data", the "per-hour data", and to the "date and time data" is 2:2:1.

The memory unit 21 is, for example, a semiconductor memory device, such as a flash memory, or a memory device, such as a hard disk or an optical disk. The memory unit 21 is not limited to the type of memory device described above. For example, the memory unit 21 may also be a random access memory (RAM) or a read only memory (ROM).

The control unit 22 includes an internal memory that stores therein control data and programs prescribing various procedures. These units execute various kinds of processes. As illustrated in FIG. 7, the control unit 22 includes the storing unit 22a, the creating unit 22b, the determining unit 22c, and the deleting unit 22d.

The storing unit 22a stores data in the measurement data DB 16b. For example, the storing unit 22a stores, in the measurement data DB 16b, data that is transmitted from the network information collecting device 13 and is received by the I/F 20. Furthermore, the storing unit 22a stores, in the measurement data DB 16b, the measurement data that is transmitted from the server information collecting device 14 and is received by the I/F 20. Furthermore, the storing unit 22a stores data in a record, from among records in which data is not stored, that has the minimum sequence number.

The creating unit 22b creates and updates the index 21a described above or updates the first queue label 21b and the second queue label 21c. For example, every time the creating unit 22b receives data transmitted from the network information collecting device 13 or the server information collecting device 14 via the I/F 20, the creating unit 22b creates the indexes 21a using various kinds of information contained in the received data. For example, the creating unit 22b sets the "data type" contained in the data in the "type" of the index 21a. Furthermore, the creating unit 22b determines the previous and subsequent relationship of the "date and time" of the indexes 21a whose "data type" are the same and sets, in the "previous index", an address of the immediately previous index 21a that has the immediately previous "date and time". Furthermore, the creating unit 22b sets the size of data in the "data size" of the index 21a. Furthermore, the creating unit 22b sets, in the "DB storing information" in the index 21a, an address in which the index 21a is stored in a memory area in the memory unit 21.

Furthermore, when creating a new index 21a, the creating unit 22b performs the following process. Namely, the creating unit 22b sets an address of a new index 21a in the "subsequent index" of the immediately previous index 21a that has the same "data type" as that of the new created index 21a and that has the immediately previous "date and time" to the new index 21a.

If, for example, an address is not set in the "top index" of the first queue label 21b, the creating unit 22b performs a process as follows. The creating unit 22b sets an address, in which the index 21a of the top data contained in the queue indicated by the first queue label 21b is stored in an memory area in the memory unit 21, in the "top index" of the first queue label 21b.

Furthermore, the creating unit 22b sets an address, in which the index 21a of the last data contained in the queue indicated by the first queue label 21b is stored in a memory area in the memory unit 21, in the "last index" of the first queue label 21b. Furthermore, the creating unit 22b calculates the sum of the size of the data indicated by the indexes 21a that are contained in a queue and are retained in the measurement data DB 16b and sets the calculated sum in the "queue length (size)" of the first queue label 21b.

For the data contained in the measurement data DB 16b whose retention period has elapsed, the determining unit 22c determines whether the size of the data exceeds its threshold. For example, the determining unit 22c performs a process described below at predetermined time intervals, which is determined for each data type: at 15-second intervals if the data type is the "per-minute data", and at 15-minute intervals if the data type is the "per-hour data". Furthermore, the determining unit 22c performs a process described below at six-hour intervals if the data type is the "per-day data". Specifically, from among indexes 21a having the data type of the "per-minute data", the determining unit 22c determines, at 15-second intervals, whether an index 21a that is retained for longer than three months from the "date and time" is present and specifies the index 21a that is retained for longer than three months from the "date and time". Furthermore, from among indexes 21a having the data type of the "per-hour data", the determining unit 22c determines, at 15-minute intervals, whether an index 21a that is retained for longer than one year from the "date and time" is present and specifies the index 21a that is retained for longer than one year from the "date and time". Furthermore, from the indexes 21a having the data type of the "per-day data", the determining unit 22c determines, at 15-minute intervals, whether an index 21a that is retained for longer than three years from the "date and time" is present and specifies the index 21a that is retained for longer than three years from the "date and time".

Then, the determining unit 22c determines the index 21a that is retained for longer than three months from the "date and time" and that has the data type of the "per-minute data" as the last data contained in the queue indicated by the second queue label 21c associated with the "per-minute data". In a description below, an index 21a that is retained for longer than three months from the "date and time" and that has the data type of the "per-minute data" is referred to as a "log index (per-minute)". A specific description will be given below. For a log index (per-minute), the determining unit 22c performs the following process by using an address of the immediately previous index 21a that is contained in a queue indicated by the second queue label 21c associated with the per-minute data, that has the "type" of the "per-minute data", and that has the immediately previous "date and time". Namely, the determining unit 22c sets that address in the "previous index" of the log index (per-minute). Furthermore, the determining unit 22c sets an address of a log index (per-minute) in the "subsequent index" contained in the immediately previous index 21a that is contained in the queue indicated by the second queue label 21c associated with the per-minute data, that has the "type" of the "per-minute data", and that has the immediately previous "date and time". Accordingly, the log index (per-minute) is virtually extracted from a virtual queue that is used to retain the "per-minute data" for three months and is virtually stored in a virtual queue that is used to retain the log index (per-minute) until the size of the "per-minute data" reaches a predetermined threshold. The determining unit 22c calculates a spare retention area and then calculates the predetermined threshold by using the ratio with respect to the "per-minute data" contained in the setup table 21d. For example, when using the setup table 21d illustrated in FIG. 20 as an example, the determining unit 22c calculates ⅖ of the spare retention area as the threshold associated with the "per-minute data".

Furthermore, the determining unit 22c subtracts the "data size" of the log index (per-minute) from the "queue length (size)" of the first queue label 21b associated with the "per-minute data". The reason for subtracting the "data size" of the log index (per-minute) from the "queue length (size)" of the first queue label 21b associated with the "per-minute data" in this way is that the log index (per-minute) is virtually extracted from the queue indicated by the first queue label 21b.

Furthermore, the determining unit 22c adds the "data size" of the log index (per-minute) to the "queue length (size)" of the second queue label 21c associated with the "per-minute data". The reason for adding the "data size" of the log index (per-minute) to the "queue length (size)" of the second queue label 21c associated with the "per-minute data" in this way is that the index 21a associated with the log index (per-minute) is virtually stored in the queue indicated by the second queue label 21c.

Furthermore, the determining unit 22c performs the following process by using an address of the index 21a of the top data contained in a queue indicated by the first queue label 21b associated with the "per-minute data", i.e., a virtual queue that is used to retain the "per-minute data" for three months. Namely, the determining unit 22c sets the address in the "top index" of the first queue label 21b associated with the "per-minute data". The reason for setting the address in the "top index" of the first queue label 21b associated with the "per-minute data" in this way is that the log index (per-minute) is virtually extracted from the queue and the top index 21a contained in the queue is changed.

Furthermore, the determining unit 22c performs the following process by using an address of an index 21a of the last data contained in a queue indicated by the second queue label 21c associated with the "per-minute data", i.e., a virtual queue that is used to retain the "per-minute data" until the size of the "per-minute data" reaches a predetermined threshold. Specifically, the determining unit 22c sets the address in the "last index" of the second queue label 21c associated with the "per-minute data". The reason for resetting the address of the "last index" of the second queue label 21c associated with the "per-minute data" in this way is that an index 21a is virtually stored in the last part of the queue and the index 21a arranged in the last part of the queue is changed.

Furthermore, the determining unit 22c determines, at predetermined time intervals, whether the "queue length (size)" of the second queue label 21c associated with the "per-minute data" exceeds the threshold associated with the "per-minute data". Accordingly, it is determined whether the size of the "per-minute data" retained in the spare retention area has reached the threshold associated with the "per-minute data".

Furthermore, the determining unit 22c determines the index 21a that is retained for longer than one year from the "date and time" and that has the data type of the "per-hour data" as the last data contained in the queue indicated by the second queue label 21c associated with the "per-hour data". In a description below, an index 21a that is retained for longer than one year from the "date and time" and that has the data type of the "per-hour data" is referred to as a "log index (per-hour)". A specific description will be given below. For a log index (per-hour), the determining unit 22c performs the following process by using an address of the immediately previous index 21a that is contained in a queue indicated by the second queue label 21c associated with the per-hour data, that has the "type" of the "per-hour data", and that has the immediately previous "date and time". Namely, the determining unit 22c sets that address in the "previous index" of the log index (per-hour). Furthermore, the determining unit 22c sets an address of a log index (per-hour) in the "subsequent index" contained in the immediately previous index 21a that is contained in the queue indicated by the second queue label 21c associated with the per-hour data, that has the "type" of the "per-hour data", and that has the immediately previous "date and time". Accordingly, the log index (per-hour) is virtually extracted from a virtual queue that is used to retain the "per-hour data" for one year and is virtually stored in a virtual queue that is used to retain the log index (per-hour) until the size of the "per-hour data" reaches a predetermined threshold. The determining unit 22c calculates a spare retention area and then calculates the predetermined threshold by using the ratio with respect to the "per-hour data" contained in the setup table 21d. For example, when using the setup table 21d illustrated in FIG. 20 as an example, the determining unit 22c calculates ⅖ of the spare retention area as the threshold associated with the "per-hour data".

Furthermore, the determining unit 22c subtracts the "data size" of the log index (per-hour) from the "queue length (size)" of the first queue label 21b associated with the "per-hour data". The reason for subtracting the "data size" of the log index (per-hour) from the "queue length (size)" of the first queue label 21b associated with the "per-hour data" in this way is that the log index (per-hour) is virtually extracted from the queue indicated by the first queue label 21b.

Furthermore, the determining unit 22c adds the "data size" of the log index (per-hour) to the "queue length (size)" of the second queue label 21c associated with the "per-hour data". The reason for adding the "data size" of the log index (per-hour) to the "queue length (size)" of the second queue label 21c associated with the "per-hour data" in this way is that the index 21a associated with the log index (per-hour) is virtually stored in the queue indicated by the second queue label 21c.

Furthermore, the determining unit 22c performs the following process by using an address of the index 21a of the top data contained in a queue indicated by the first queue label 21b associated with the "per-hour data", i.e., a virtual queue that is used to retain the "per-hour data" for one year. The determining unit 22c sets the address in the "top index" of the first queue label 21b associated with the "per-hour data". The reason for setting the address in the "top index" of the first queue label 21b associated with the "per-hour data" in this way is that the log index (per-hour) is virtually extracted from the queue and the top index 21a contained in the queue is changed.

Furthermore, the determining unit 22c performs the following process by using an address of an index 21a of the last data contained in a queue indicated by the second queue label 21c associated with the "per-hour data", i.e., a virtual queue that is used to retain the "per-hour data" until the size the "per-hour data" reaches a predetermined threshold. Specifically, the determining unit 22c sets the address in the "last index" of the second queue label 21c associated with the "per-hour data". The reason for resetting the address of the "last index" of the second queue label 21c associated with the "per-hour data" in this way is that the index 21a is virtually stored in the last part of the queue and the index 21a arranged in the last part of the queue is changed.

Furthermore, the determining unit 22c determines, at predetermined time intervals, whether the "queue length (size)" of the second queue label 21c associated with the "per-hour data" exceeds the threshold associated with the "per-hour data". Accordingly, it is determined whether the size of the "per-hour data" retained in the spare retention area has reached the threshold associated with the "per-hour data".

Furthermore, the determining unit 22c determines the index 21a that is retained for longer than three years from the "date and time" and that has the data type of the "per-day data" as the last data contained in the queue indicated by the second queue label 21c associated with the "per-day data". In a description below, an index 21a that is retained for longer than three years from the "date and time" and that has the data type of the "per-day data" is referred to as a "log index (per-day)". A specific description will be given below. For a log index (per-day), the determining unit 22c performs the following process by using an address of the immediately previous index 21a that is contained in a queue indicated by the second queue label 21c associated with the per-day data, that has the "type" of the "per-day data", and that has the immediately previous "date and time". The determining unit 22c sets that address in the "previous index" of a log index (per-day). Furthermore, the determining unit 22c sets an address of a log index (per-day) in the "subsequent index" contained in the immediately previous index 21a that is contained in the queue indicated by the second queue label 21c associated with the per-day data, that has the "type" of the "per-day data", and that has the immediately previous "date and time". Accordingly, the log index (per-day) is virtually extracted from a virtual queue that is used to retain the "per-day data" for three years and is virtually stored in the a virtual queue that is used to retain the log index (per-day) until the size of the "per-day data" reaches a predetermined threshold. The determining unit 22c calculates a spare retention area and then calculates the predetermined threshold by using the ratio with respect to the "per-day data" contained in the setup table 21d. For example, when using the setup table 21d illustrated in FIG. 20 as an example, the determining unit 22c calculates ⅕ of the spare retention area as the threshold associated with the "per-day data".

Furthermore, the determining unit 22c subtracts the "data size" of the log index (per-day) from the "queue length (size)" of the first queue label 21b associated with the "per-day data". The reason for subtracting the "data size" of the log index (per-day) from the "queue length (size)" of the first queue label 21b associated with the "per-day data" in this way is that the log index (per-day) is virtually extracted from the queue indicated by the first queue label 21b.

Furthermore, the determining unit 22c adds the "data size" of the log index (per-day) to the "queue length (size)" of the second queue label 21c associated with the "per-day data". The reason for adding the "data size" of the log index (per-day) to the "queue length (size)" of the second queue label 21c associated with the "per-day data" in this way is that the index 21a associated with the log index (per-day) is virtually stored in the queue indicated by the second queue label 21c.

Furthermore, the determining unit 22c performs the following process by using an address of the index 21a of the top data contained in a queue indicated by the first queue label 21b associated with the "per-day data", i.e., a virtual queue that is used to retain the "per-day data" for one year. The determining unit 22c sets the address in the "top index" of the first queue label 21b associated with the "per-day data". The reason for setting the address in the "top index" of the first queue label 21b associated with the "per-day data" in this way is that the log index (per-day) is virtually extracted from the queue and the top index 21a contained in the queue is changed.

Furthermore, the determining unit 22c performs the following process by using an address of an index 21a of the last data contained in a queue indicated by the second queue label 21c associated with the "per-day data", i.e., a virtual queue that is used to retain the "per-day data" until the size of the "per-day data" reaches a predetermined threshold. Namely, the determining unit 22c sets the address in the "last index" of the second queue label 21c associated with the "per-day data". The reason for resetting the address of the "last index" of the second queue label 21c associated with the "per-day data" in this way is that an index 21a is virtually stored in the last part of the queue and the index 21a arranged in the last part of the queue is changed.

Furthermore, the determining unit 22c determines, at predetermined time intervals, whether the "queue length (size)" of the second queue label 21c associated with the "per-day data" exceeds the threshold associated with the "per-day data". Accordingly, it is determined whether the size of the "per-day data" retained in the spare retention area has reached the threshold associated with the "per-day data".

The deleting unit 22d deletes, from the measurement data DB 16b, the data whose data type has reached the threshold in order to reduce the size of the data that has reached its threshold, which is specified for each data type, to a size smaller than the threshold. For example, the deleting unit 22d deletes data in chronological order of the date such that the size of the data becomes smaller than the threshold.

For example, if the determining unit 22c determines that the "queue length (size)" of the second queue label 21c associated with the "per-minute data" exceeds the threshold associated with the "per-minute data", the deleting unit 22d performs the following process. Specifically, the deleting unit 22d deletes, from the measurement data DB 16b, the data associated with the index 21a indicated by the "top index" of the second queue label 21c associated with the "per-minute data". More specifically, the deleting unit 22d deletes, from the measurement data DB 16b, the data retained in a record having a sequence number indicated by the "DB storing information" contained in the index 21a indicated by the "top index".

Furthermore, the deleting unit 22d subtracts the "data size" of the index 21a indicated by the "top index" of the second queue label 21c associated with the "per-minute data" from the "queue length (size)" of the second queue label 21c associated with the "per-minute data". The reason for performing the subtraction is that the index 21a indicated by the "top index" is virtually extracted from the virtual queue indicated by the second queue label 21c associated with the "per-minute data".

Furthermore, the deleting unit 22d deletes, from the memory unit 21, the index 21a indicated by the "top index" of the second queue label 21c associated with the "per-minute data". Accordingly, the index 21a indicated by the "top index" is virtually extracted from the virtual queue indicated by the second queue label 21c associated with the "per-minute data".

Furthermore, the deleting unit 22d performs the following process by using the address of the index 21a of the top data contained in the queue indicated by the second queue label 21c associated with the "per-minute data". Namely, the deleting unit 22d sets the address in the "top index" of the second queue label 21c associated with the "per-minute data". The reason for resetting that address in the "top index" of the second queue label 21c associated with the "per-minute data" in this way is that the index 21a is virtually extracted from the queue and the top index 21a contained in the queue is changed.

Furthermore, if determining unit 22c determines that the "queue length (size)" of the second queue label 21c associated with the "per-hour data" exceeds the threshold associated with the "per-hour data", the deleting unit 22d performs the following process. Specifically, the deleting unit 22d deletes, from the measurement data DB 16b, the data associated with the index 21a indicated by the "top index" of the second queue label 21c associated with the "per-hour data". More specifically, the deleting unit 22d deletes, from the measurement data DB 16b, the data retained in a record having a sequence number indicated by the "DB storing information" contained in the index 21a indicated by the "top index".

Furthermore, the deleting unit 22d subtracts the "data size" of the index 21a indicated by the "top index" of the second queue label 21c associated with the "per-hour data" from the "queue length (size)" of the second queue label 21c associated with the "per-hour data". The reason for performing the subtraction is that the index 21a indicated by the "top index" is virtually extracted from the virtual queue indicated by the second queue label 21c associated with the "per-hour data".

Furthermore, the deleting unit 22d deletes, from the memory unit 21, the index 21a indicated by the "top index" of the second queue label 21c associated with the "per-hour data". Accordingly, the index 21a indicated by the "top index" is virtually extracted from the virtual queue indicated by the second queue label 21c associated with the "per-hour data".

Furthermore, the deleting unit 22d performs the following process by using the address of the index 21a of the top data contained in the queue indicated by the second queue label 21c associated with the "per-hour data". Namely, the deleting unit 22d sets the address in the "top index" of the second queue label 21c associated with the "per-hour data". The reason for resetting that address in the "top index" of the second queue label 21c associated with the "per-hour data" in this way is that the index 21a is virtually extracted from the queue and the top index 21a contained in the queue is changed.

Furthermore, if the determining unit 22c determines that the "queue length (size)" of the second queue label 21c associated with the "per-day data" exceeds the threshold associated with the "per-day data", the deleting unit 22d performs the following process. Namely, the deleting unit 22d deletes, from the measurement data DB 16b, the data associated with the index 21a indicated by the "top index" of the second queue label 21c associated with the "per-day data". Specifically, the deleting unit 22d deletes, from the measurement data DB 16b, the data retained in a record having a sequence number indicated by the "DB storing information" contained in the index 21a indicated by the "top index".

Furthermore, the deleting unit 22d subtracts the "data size" of the index 21a indicated by the "top index" of the second queue label 21c associated with the "per-day data" from the "queue length (size)" of the second queue label 21c associated with the "per-day data". The reason for performing the subtraction is that the index 21a indicated by the "top index" is virtually extracted from the virtual queue indicated by the second queue label 21c associated with the "per-day data".

Furthermore, the deleting unit 22d deletes, from the memory unit 21, the index 21a indicated by the "top index" of the second queue label 21c associated with the "per-day data". Accordingly, the index 21a indicated by the "top index" is virtually extracted from the virtual queue indicated by the second queue label 21c associated with the "per-day data".

Furthermore, the deleting unit 22d performs the following process by using the address of the index 21a of the top data contained in the queue indicated by the second queue label 21c associated with the "per-day data". Namely, the deleting unit 22d sets the address in the "top index" of the second queue label 21c associated with the "per-day data". The reason for resetting that address in the "top index" of the second queue label 21c associated with the "per-day data" in this way is that the index 21a is virtually extracted from the queue and the top index 21a contained in the queue is changed.

The control unit 22 is an integrated circuit, such as an application specific integrated circuit (ASIC) or a field programmable gate array (FPGA), or is an electronic circuit, such as a central processing unit (CPU) or a micro processing unit (MPU).

Figure 21:
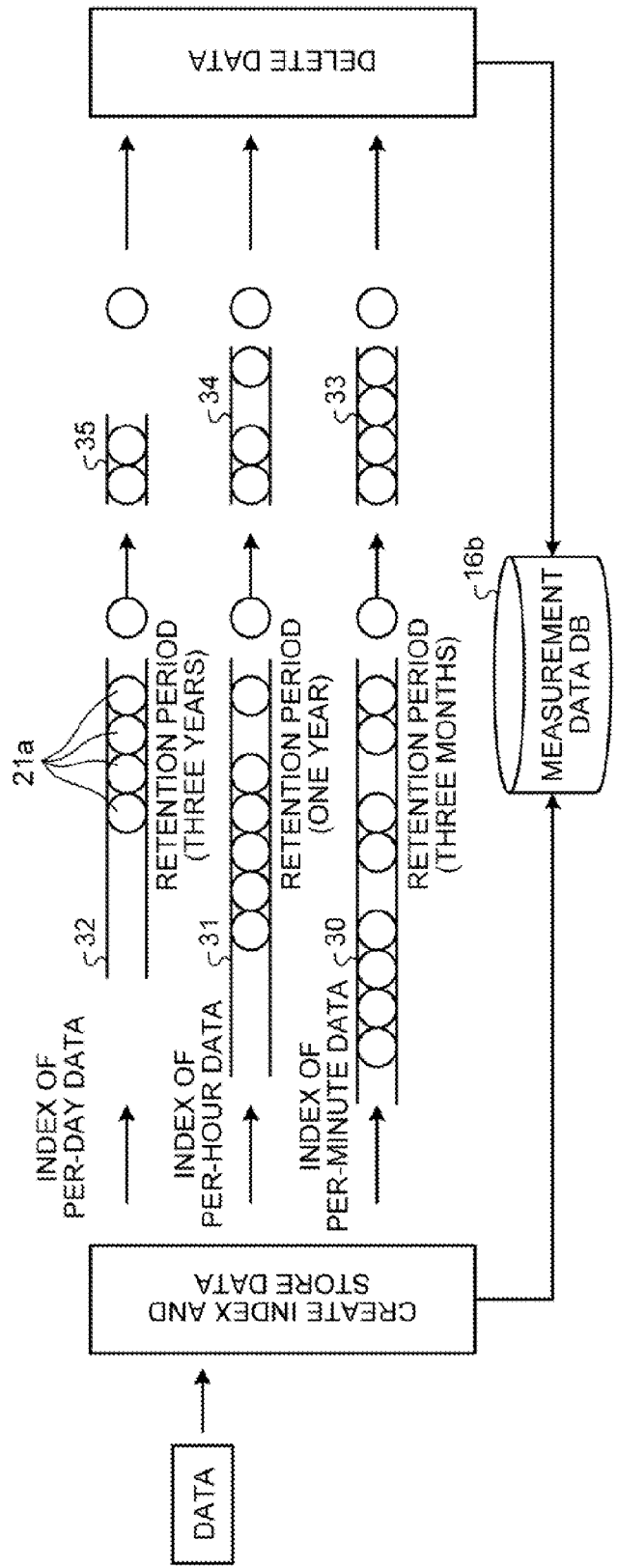
FIG. 21 is a schematic diagram illustrating an example of the operation of the management device.

In the following, an example of the operation of the management device 10 will be described. FIG. 21 is a schematic diagram illustrating an example of the operation of the management device. As illustrated in FIG. 21, when receiving data from the network information collecting device 13 and the server information collecting device 14, the management device 10 stores the received data in the measurement data DB 16b. If the type of the received data is the "per-minute data", the management device 10 virtually stores the index 21a in a virtual queue 30 indicated by the first queue label 21b associated with the "per-minute data". If the type of the received data is the "per-hour data", the management device 10 virtually stores the index 21a in a virtual queue 31 indicated by the first queue label 21b associated with the "per-hour data". If the type of the received data is the "per-day data", the management device 10 virtually stores the index 21a in a virtual queue 32 indicated by the first queue label 21b associated with the "per-day data".

Then, as illustrated in FIG. 21, if a predetermined time period, for example, three months, has elapsed for a retention period of the index 21a of the queue 30, the management device 10 virtually extracts the index 21a from the queue 30. Furthermore, if a predetermined time period, for example, one year, has elapsed for a retention period of the index 21a of the queue 31, the management device 10 virtually extracts the index 21a from the queue 31. Furthermore, if a predetermined time period, for example, three years, has elapsed for a retention period of the index 21a of the queue 32, the management device 10 virtually extracts the index 21a from the queue 32.

Then, the management device 10 virtually stores the index 21a extracted from the queue 30 in the virtual queue 33 indicated by the second queue label 21c associated with the "per-minute data". Furthermore, the management device 10 virtually stores the index 21a extracted from the queue 31 in the virtual queue 34 indicated by the second queue label 21c associated with the "per-hour data". Furthermore, the management device 10 virtually stores the index 21a extracted from the queue 32 in the virtual queue 35 indicated by the second queue label 21c associated with the "per-day data".

Then, if the sum of the size of the data indicated by the index 21a contained in the queue 33 has reached its threshold, the management device 10 virtually extracts the index 21a from the queue 33. Furthermore, if the sum of the size of the data indicated by the index 21a contained in the queue 34 has reached its threshold, the management device 10 virtually extracts the index 21a from the queue 34. Furthermore, if the sum of the size of the data indicated by the index 21a contained in the queue 35 has reached its threshold, the management device 10 virtually extracts the index 21a from the queue 35. Then, the management device 10 deletes the data associated with the extracted index 21a from the measurement data DB 16b.

As described above, with the management device 10 according to the first embodiment, the entire memory area in the measurement data DB 16b can be used to retain various data. In other words, when retaining various data, the management device 10 according to the first embodiment also use a spare retention area. Accordingly, the management device 10 according to the first embodiment can effectively a spare retention area.

Flow of a Process

Figure 22:
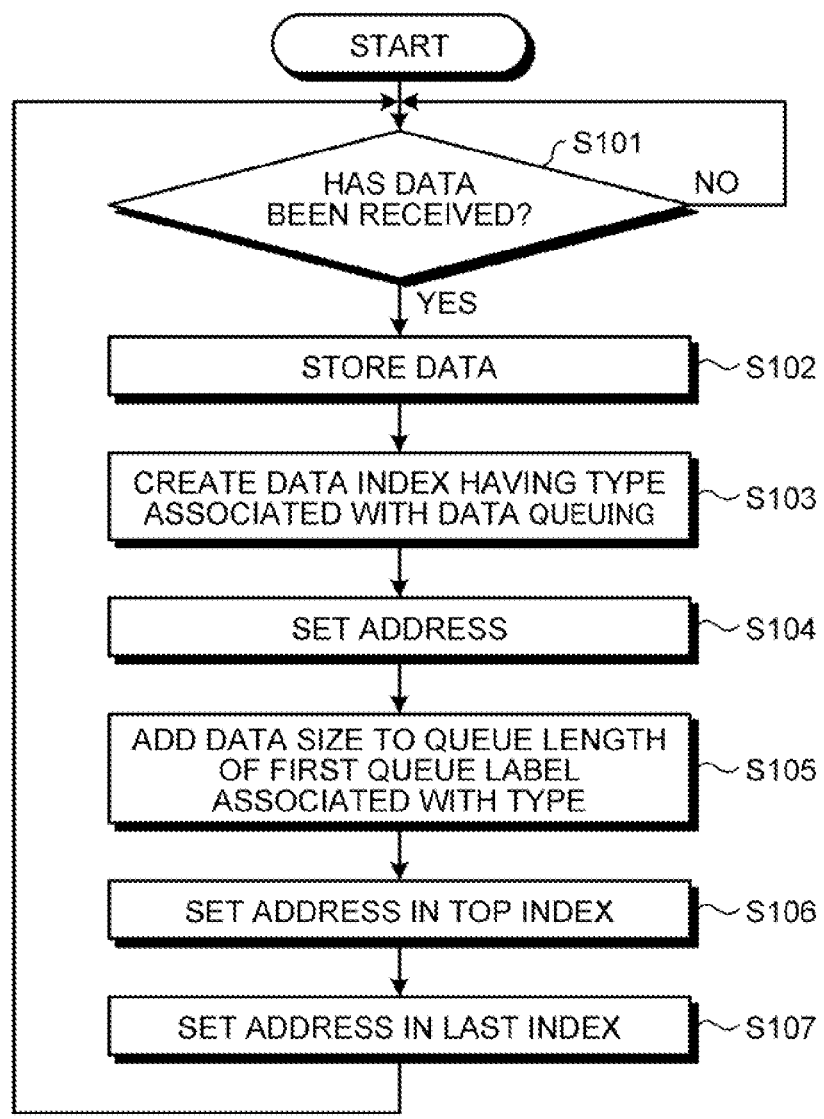
FIG. 22 is a flowchart illustrating the flow of a storing process according to the first embodiment.

In the following, the flow of a process performed by the management device 10 according to the first embodiment will be described. The processes described with reference to FIGS. 22 to 27 are individually performed. FIG. 22 is a flowchart illustrating the flow of a storing process according to the first embodiment. The storing process is repeatedly performed for a period of time during which a power supply of the management device 10 is turned on.

As illustrated in FIG. 22, when receiving data transmitted from the network information collecting device 13 or the server information collecting device 14 via the I/F 20 (Yes at Step S101), the storing unit 22a stores the received data in the measurement data DB 16b (Step S102). The creating unit 22b creates an index 21a using various kinds of information contained in the received data (Step S103).

The creating unit 22b sets an address of a new index 21a in the "subsequent index" of the immediately previous index 21a that has the same "data type" as that of the new created index 21a and that has the immediately previous "date and time" to the new index 21a (Step S104). The creating unit 22b calculates the sum of the size of the data that is indicated by each index 21a contained in the queue and is retained in the measurement data DB 16b and sets the calculated sum as the "queue length (size)" of the first queue label 21b (Step S105). The creating unit 22b sets an address, in which an index 21a of the top data of the queue indicated by the first queue label 21b is stored in a memory area in the memory unit 21, as the "top index" of the first queue label 21b (Step S106). If the address is set in the "top index" of the first queue label 21b, the process performed at Step S106 can be omitted. The creating unit 22b sets, in the "last index" of the first queue label 21b, an address in which an index 21a of the last data contained in the queue indicated by the first queue label 21b is stored in the memory area in the memory unit 21 (Step S107) and the process returns to Step S101.

Figure 23:
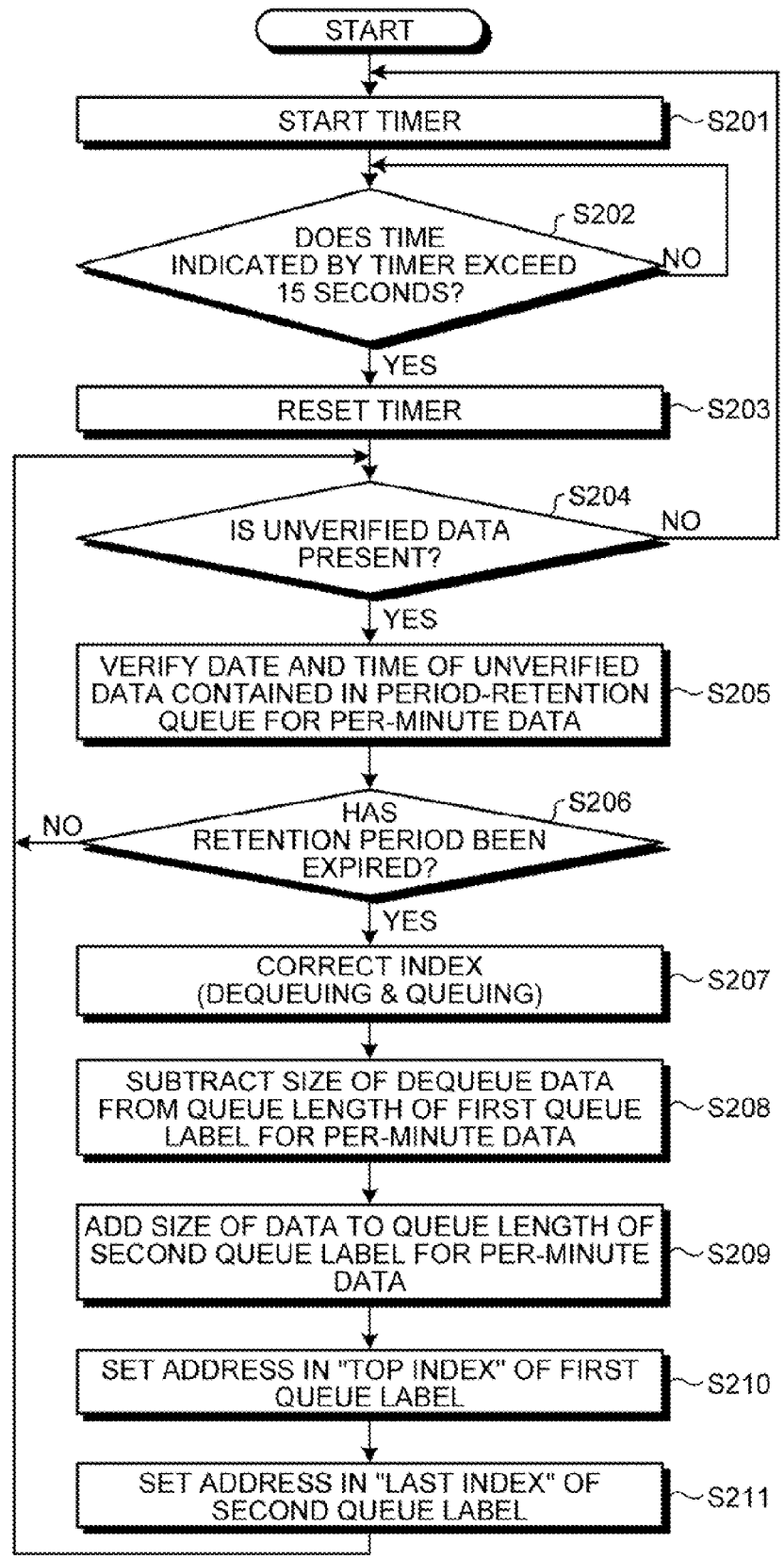
FIG. 23 is a flowchart illustrating the flow of a first determining process performed on the per-minute data according to the first embodiment.

FIG. 23 is a flowchart illustrating the flow of a first determining process performed on the per-minute data according to the first embodiment. The first determining process performed on the per-minute data is performed for a period of time during which the power supply of the management device 10 is turned on.

As illustrated in FIG. 23, the determining unit 22c starts a timer (Step S201). The determining unit 22c determines whether the time indicated by the timer exceeds 15 seconds (Step S202). If the time indicated by the timer exceeds 15 seconds (Yes at Step S202), the determining unit 22c resets the timer (Step S203).

After resetting the timer, at Step S205, which will be described later, the determining unit 22c determines whether the following index 21a is present. Namely, the determining unit 22c determines whether an index 21a that is contained in the queue indicated by the first queue label 21b associated with the "per-minute data" and that has the "date and time" that has not yet been verified is present (Step S204). If no index in which the "date and time" is not yet verified is present (No at Step S204), the process returns to Step S201. In contrast, if an index in which the "date and time" has not yet been verified is present (Yes at Step S204), the determining unit 22c performs the following process. Namely, the determining unit 22c verifies the "date and time" of the index 21a that is contained in the queue indicated by the first queue label 21b associated with the "per-minute data" and that has the "date and time" that has not yet been verified (Step S205).

The determining unit 22c determines whether three months have elapsed after the verified "date and time" (Step S206). If three months have not yet elapsed from the verified "date and time" (No at Step S206), the determining unit 22c returns to Step S204. In contrast, three months have elapsed from the verified "date and time" (Yes at Step S206), the determining unit 22c corrects the index 21a (Step S207). A specific example will be described below. For the log index (per-minute), the determining unit 22c performs the following process by using an address of the immediately previous index 21a that is contained in the queue indicated by the second queue label 21c associated with the per-minute data, that has the "type" of the "per-minute data", and that has the immediately previous "date and time". Namely, the determining unit 22c sets the address in the "previous index" of the log index (per-minute). Furthermore, the determining unit 22c sets an address of a log index (per-minute) in the "subsequent index" of the immediately previous index 21a that is contained in the queue indicated by the second queue label 21c associated with the per-minute data, that has the "type" of the "per-minute data", and that has the immediately previous "date and time".

The determining unit 22c subtracts the "data size" of the log index (per-minute) from the "queue length (size)" of the first queue label 21b associated with the "per-minute data" (Step S208). The determining unit 22c adds the "data size" of the log index (per-minute) to the "queue length (size)" of the second queue label 21c associated with the "per-minute data" (Step S209).

The determining unit 22c performs the following process by using an address of an index 21a of the top data contained in a queue indicated by the first queue label 21b associated with the "per-minute data", i.e., a virtual queue that is used to retain the "per-minute data" for one year. Namely, the determining unit 22c sets the address in the "top index" of the first queue label 21b associated with the "per-minute data" (Step S210).

The determining unit 22c performs the following process by using an address of an index 21a of the last data contained in a queue indicated by the second queue label 21c associated with the "per-minute data", i.e., a virtual queue that is used to retain the "per-minute data" until the size of the "per-minute data" reaches a predetermined threshold. Namely, the determining unit 22c sets the address in the "last index" of the second queue label 21c associated with the "per-minute data" (Step S211). Then, the process returns to Step S204.

Figure 24:
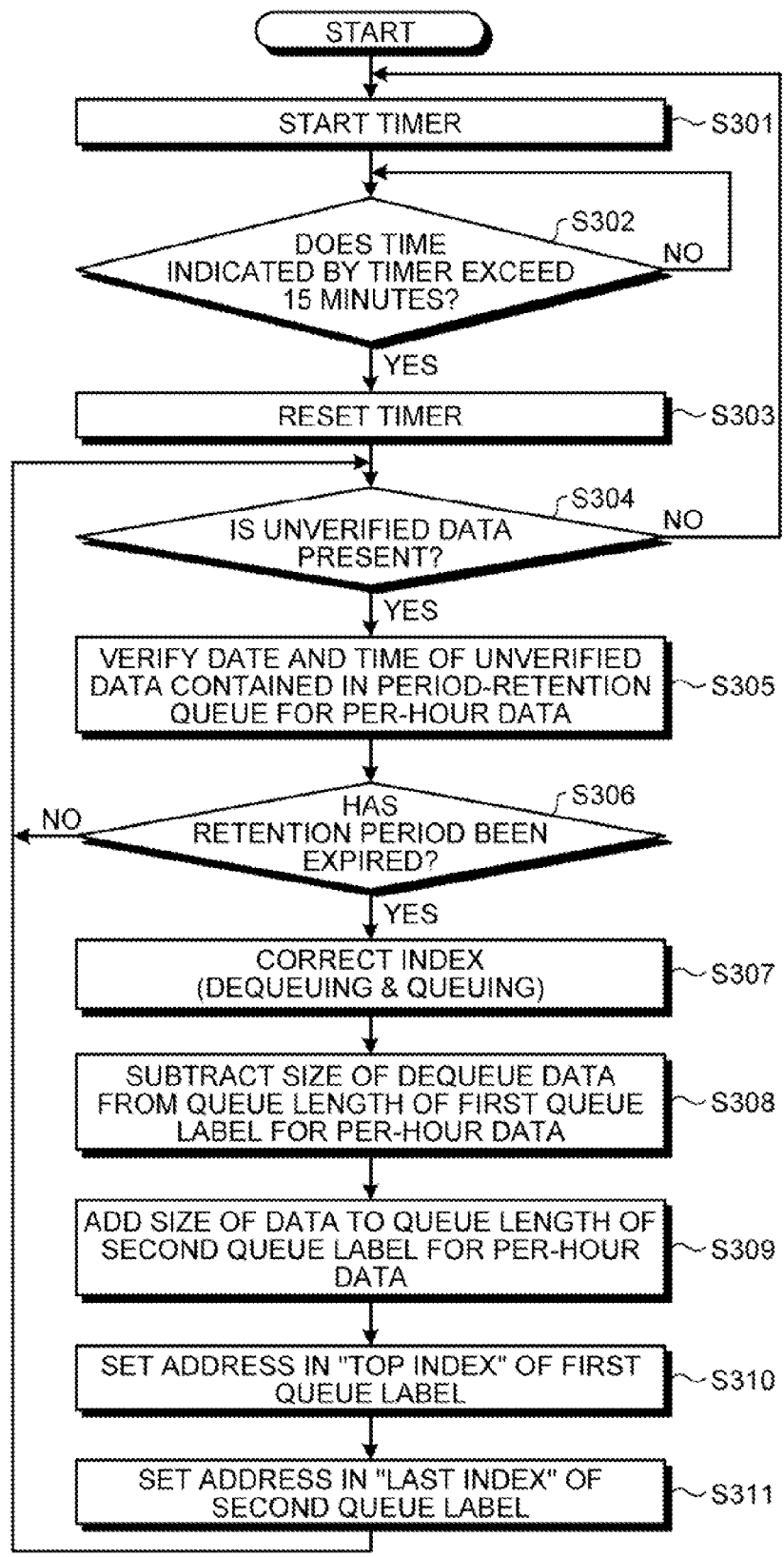
FIG. 24 is a flowchart illustrating the flow of the first determining process performed on the per-hour data according to the first embodiment.

FIG. 24 is a flowchart illustrating the flow of the first determining process performed on the per-hour data according to the first embodiment. The first determining process performed on the per-hour data is performed for a period of time during which the power supply of the management device 10 is turned on.

As illustrated in FIG. 24, the determining unit 22c starts the timer (Step S301). The determining unit 22c determines whether the time indicated by the timer exceeds 15 minutes (Step S302). If the time indicated by the timer exceeds 15 minutes (Yes at Step S302), the determining unit 22c resets the timer (Step S303).

After resetting the timer, at Step S305, which will be described later, the determining unit 22c determines whether the following index 21a is present. Namely, the determining unit 22c determines whether an index 21a that is contained in the queue indicated by the first queue label 21b associated with the "per-hour data" and that has the "date and time" that is not yet verified is present (Step S304). If no index in which the "date and time" is not yet verified is present (No at Step S304), the process returns to Step S301. In contrast, if an index in which the "date and time" is not yet verified is present (Yes at Step S304), the determining unit 22c performs the following process. Namely, the determining unit 22c verifies the "date and time" of the index 21a that is contained in the queue indicated by the first queue label 21b associated with the "per-hour data" and that has the "date and time" that is not yet verified (Step S305).

The determining unit 22c determines whether one year has elapsed after the verified "date and time" (Step S306). If one year has not yet elapsed from the verified "date and time" (No at Step S306), the determining unit 22c returns to Step S304. In contrast, one year has elapsed from the verified "date and time" (Yes at Step S306), the determining unit 22c corrects the index 21a (Step S307). A specific example will be described below. For the log index (per-hour), the determining unit 22c performs the following process by using the address of the immediately previous index 21a that is contained in a queue indicated by the second queue label 21c associated with the per-hour data, that has the "type" of the "per-hour data", and that has the immediately previous "date and time". Namely, the determining unit 22c sets the address in the "previous index" of the log index (per-hour). Furthermore, the determining unit 22c sets an address of a log index (per-hour) in the "subsequent index" contained in the immediately previous index 21a that is contained in the queue indicated by the second queue label 21c associated with the per-hour data, that has the "type" of the "per-hour data", and that has the immediately previous "date and time".

The determining unit 22c subtracts the "data size" of the log index (per-hour) from the "queue length (size)" of the first queue label 21b associated with the "per-hour data" (Step S308). The determining unit 22c adds the "data size" of the log index (per-hour) to the "queue length (size)" of the second queue label 21c associated with the "per-hour data" (Step S309).

The determining unit 22c performs the following process by using an address of an index 21a of the top data contained in a queue indicated by the first queue label 21b associated with the "per-hour data", i.e., a virtual queue that is used to retain the "per-hour data" for three months. Namely, the determining unit 22c sets the address in the "top index" of the first queue label 21b associated with the "per-hour data" (Step S310).

The determining unit 22c performs the following process by using an address of an index 21a of the last data contained in a queue indicated by the second queue label 21c associated with the "per-hour data", i.e., a virtual queue that is used to retain the until the size of the "per-hour data" reaches a predetermined threshold. Namely, the determining unit 22c sets the address in the "last index" of the second queue label 21c associated with the "per-hour data" (Step S311). Then, the process returns to Step S304.

Figure 25:
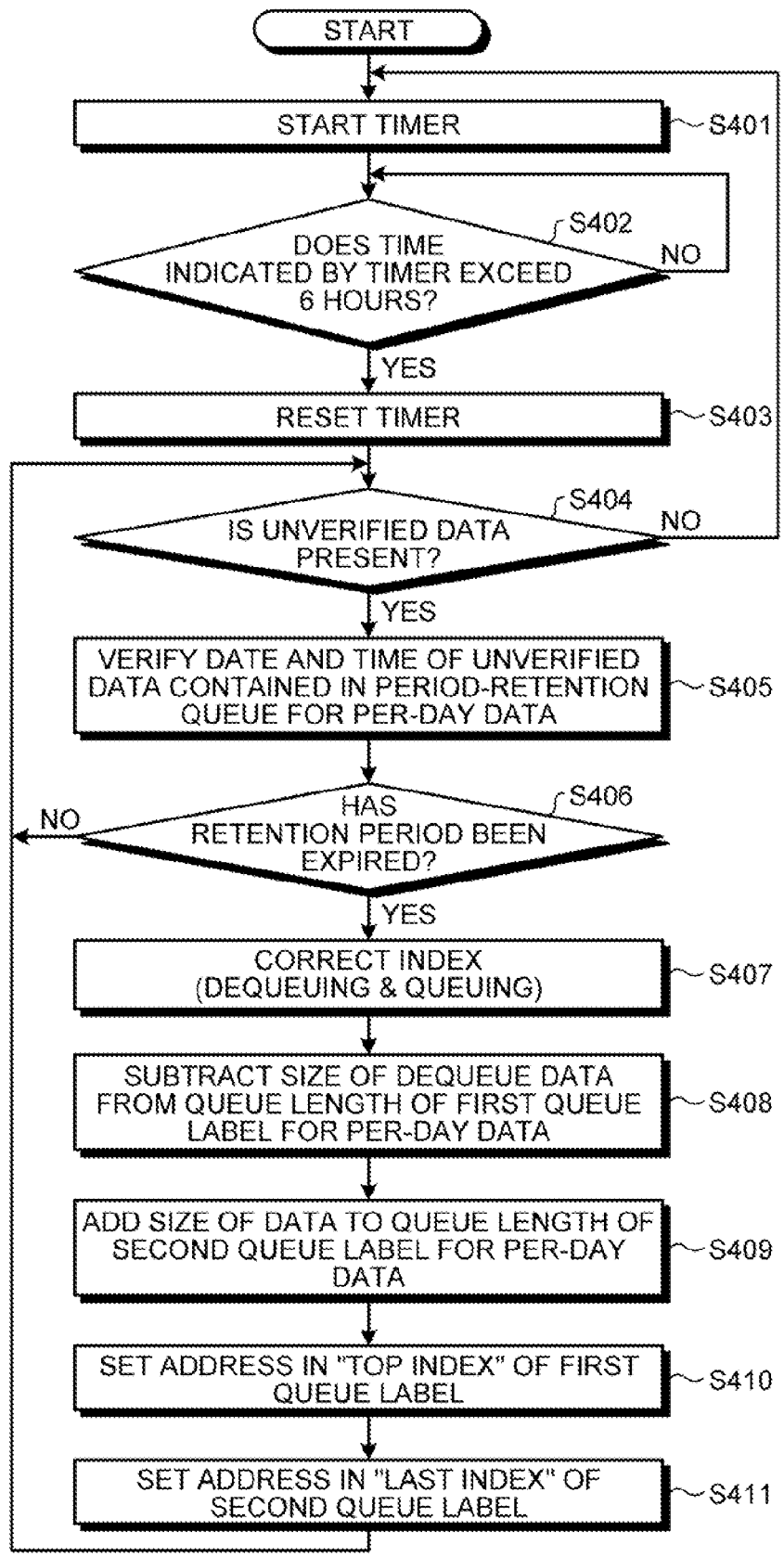
FIG. 25 is a flowchart illustrating the flow of the first determining process performed on the per-day data according to the first embodiment.

FIG. 25 is a flowchart illustrating the flow of the first determining process performed on the per-day data according to the first embodiment. The first determining process performed on the per-day data is performed for a period of time during which the power supply of the management device 10 is turned on.

As illustrated in FIG. 25, the determining unit 22c starts the timer (Step S401). The determining unit 22c determines whether the time indicated by the timer exceeds six hours (Step S402). If the time indicated by the timer exceeds six hours (Yes at Step S402), the determining unit 22c resets the timer (Step S403).

After resetting the timer, at Step S405, which will be described later, the determining unit 22c determines whether the following index 21a is present. Namely, the determining unit 22c determines whether an index 21a that is contained in the queue indicated by the first queue label 21b associated with the "per-day data" and that has the "date and time" that has not yet been verified is present (Step S404). If no index in which the "date and time" has not yet been verified is present (No at Step S404), the process returns to Step S401. In contrast, if an index in which the "date and time" has not yet been verified is present (Yes at Step S404), the determining unit 22c performs the following process. Namely, the determining unit 22c verifies the "date and time" of the index 21a that is contained in the queue indicated by the first queue label 21b associated with the "per-day data" and that has the "date and time" that has not yet been verified (Step S405).

The determining unit 22c determines whether three years have elapsed after the verified "date and time" (Step S406). If three years have not yet elapsed from the verified "date and time" (No at Step S406), the determining unit 22c returns to Step S404. In contrast, three years have elapsed from the verified "date and time" (Yes at Step S406), the determining unit 22c corrects the index 21a (Step S407). A specific example will be described below. For the log index (per-day), the determining unit 22c performs the following process by using the address of the immediately previous index 21a that is contained in the queue indicated by the second queue label 21c associated with the per-day data, that has the "type" of the "per-day data", and that has the immediately previous "date and time". Namely, the determining unit 22c sets the address in the "previous index" of the log index (per-day). Furthermore, the determining unit 22c sets an address of a log index (per-day) in the "subsequent index" contained in the immediately previous index 21a that is contained in the queue indicated by the second queue label 21c associated with the per-day data, that has the "type" of the "per-day data", and that has the immediately previous "date and time".

The determining unit 22c subtracts the "data size" of the log index (per-day) from the "queue length (size)" of the first queue label 21b associated with the "per-day data" (Step S408). The determining unit 22c adds the "data size" of the log index (per-day) to the "queue length (size)" of the second queue label 21c associated with the "per-day data" (Step S409).

The determining unit 22c performs the following process by using an address of an index 21a of the top data contained in a queue indicated by the first queue label 21b associated with the "per-day data", i.e., a virtual queue that is used to retain the "per-day data" for three years. Namely, the determining unit 22c sets the address in the "top index" of the first queue label 21b associated with the "per-day data" (Step S410).

The determining unit 22c performs the following process by using an address of an index 21a of the last data contained in a queue indicated by the second queue label 21c associated with the "per-day data", i.e., a virtual queue that is used to retain the "per-day data" until the size of the "per-day data" reaches a predetermined threshold. Namely, the determining unit 22c sets the address in the "last index" of the second queue label 21c associated with the "per-day data" (Step S411). Then, the process returns to Step S404.

Figure 26:
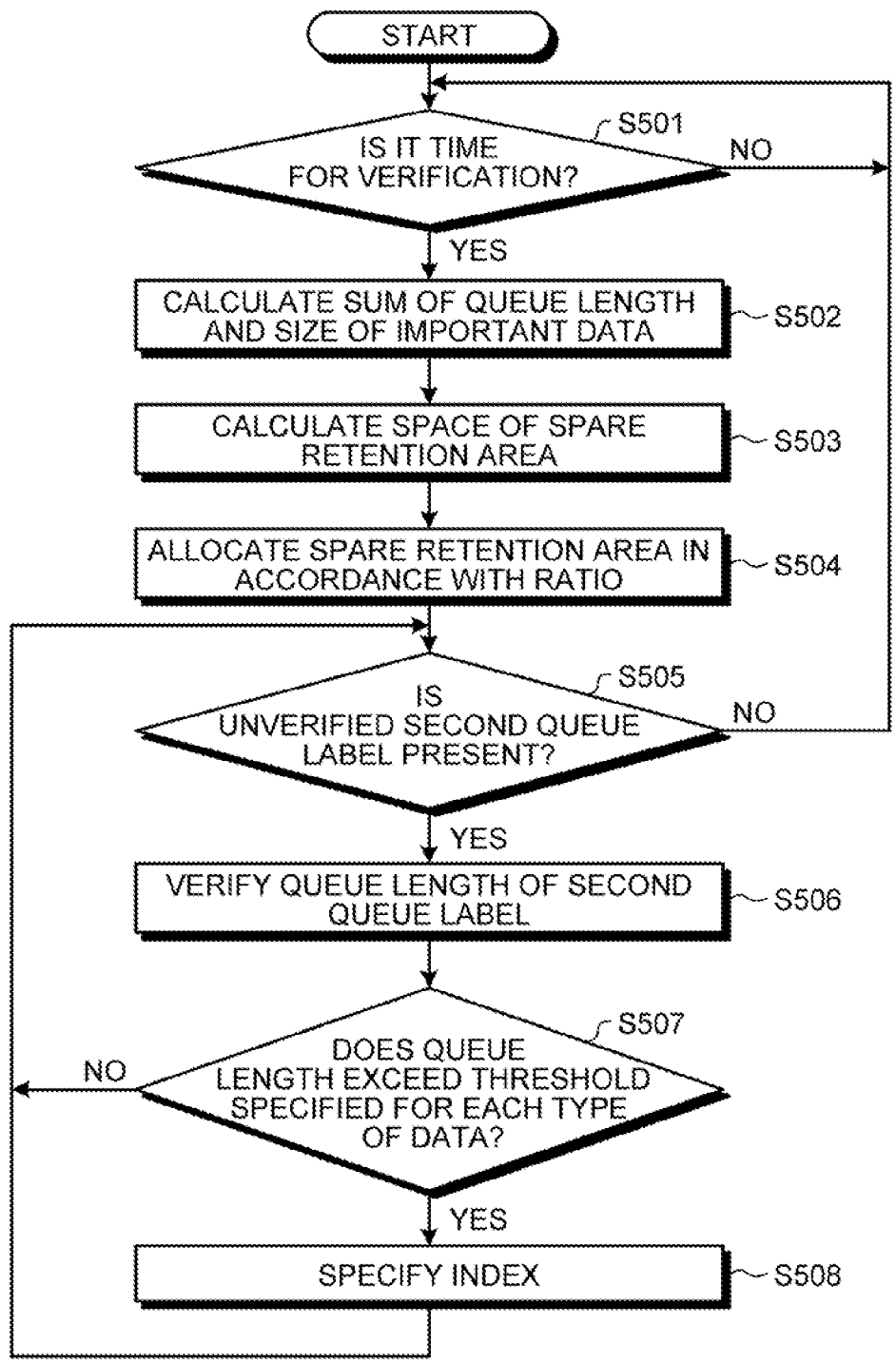
FIG. 26 is a flowchart illustrating the flow of a second determining process according to the first embodiment.

FIG. 26 is a flowchart illustrating the flow of a second determining process according to the first embodiment. The second determining process is performed for a period of time during which the power supply of the management device 10 is turned on.

As illustrated in FIG. 26, the determining unit 22c determines whether the current time is the time at which the verification is performed (Step S501). Examples of the time at which the verification is performed at predetermined time intervals, for example, at intervals of one minute.

If the current time is the time at which the verification is performed (Yes at Step S501), the determining unit 22c performs the following process. The determining unit 22c calculates the sum of the "queue length" of the first queue label 21b associated with the per-minute data, the per-hour data, and the per-day data and the data size of the "important data" (Step S502).

The determining unit 22c subtracts the sum calculated at Step S502 from the total storage capacity of the measurement data DB 16b to calculate the space of the spare retention area (Step S503). The determining unit 22c allocates the space of the spare retention area to each type of data in accordance with the ratio set in the setup table 21d (Step S504). The space of the spare retention area allocated to each type of data corresponds to a threshold for each of the data types.

After the space of the spare retention area is allocated to each type of data at Step S504, the determining unit 22c determines whether any second queue label 21c having the "queue length" that has not yet been verified at Step S506 is present, which will be described later (Step S505). If no second queue label 21c having the "queue length" that has not yet been verified at Step S506 is present (No at Step S505), the process returns to Step S501. In contrast, if the second queue label 21c having the "queue length" that has not yet been verified at Step S506 is present (Yes at Step S505), the determining unit 22c verifies the "queue length" of the second queue label 21c having the "queue length" that has not yet been verified (Step S506).

The determining unit 22c determines whether the verified "queue length" exceeds the threshold that is specified for each type of data (Step S507). If the verified "queue length" does not exceed the threshold that is specified for each type of data (No at Step S507), the process returns to Step S505. In contrast, the verified "queue length" exceeds the threshold that is specified for each type of data (Yes at Step S507), the determining unit 22c performs the following process. Namely, the determining unit 22c specifies the top index 21a of the second queue label 21c having the "queue length" that exceeds the threshold and stores the specified index 21a in the internal memory in the control unit 22 (Step S508). Then, the process returns to Step S505.

Figure 27:
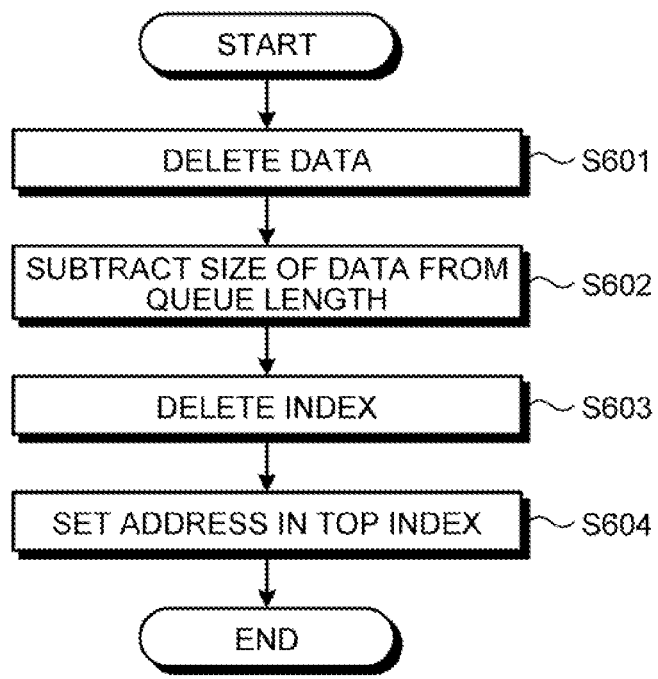
FIG. 27 is a flowchart illustrating the flow of a deleting process according to the first embodiment.

FIG. 27 is a flowchart illustrating the flow of a deleting process according to the first embodiment. The deleting process is performed every time the index 21a is specified at Step S508 described above.

As illustrated in FIG. 27, the deleting unit 22d deletes, from the measurement data DB 16b, the data retained in the record having the sequence number indicated by the "DB storing information" contained in the specified index 21a (Step S601). The deleting unit 22d subtracts the "data size" of the specified index 21a from the "queue length (size)" associated with the second queue label 21c (Step S602).

The deleting unit 22d deletes the specified index 21a from the memory unit 21 (Step S603). The deleting unit 22d performs the following process by using an address of an index 21a of the top data contained in the queue indicated by the associated second queue label 21c. Namely, the deleting unit 22d sets the address in the "top index" of the associated second queue label 21c (Step S604) and ends the process.

Advantage of the First Embodiment

As described above, because the management device 10 according to the first embodiment manages data by using the second queue label 21c after a retention period has elapsed, the entire memory area of the measurement data DB 16b can be used to retain various data. In other words, the management device 10 according to the first embodiment also uses a spare retention area when retaining various data. Accordingly, the management device 10 according to the first embodiment can effectively use the spare retention area.

[b] Second Embodiment

In the first embodiment, a case has been described, as an example, in which data is deleted when, after a retention period for data has elapsed, the sum of the size of data contained in the queue indicated by the second queue label 21c has reached its threshold; however, the management device disclosed in the present invention is not limited thereto. Accordingly, in a second embodiment, because the measurement data transmitted from the server in the standby state or in the idle state is not important data, a case in which the timing of the deletion of the measurement data DB 16b is made earlier than that in the first embodiment will be described. By doing so, less important data can be deleted first. In the second embodiment, the operation management device 15 notifies the management device 10 of the states of the web server 12b, the AP server 12c, and the DB server 12d every time the state of the servers is changed.

Configuration of the Management Device

Figure 28:
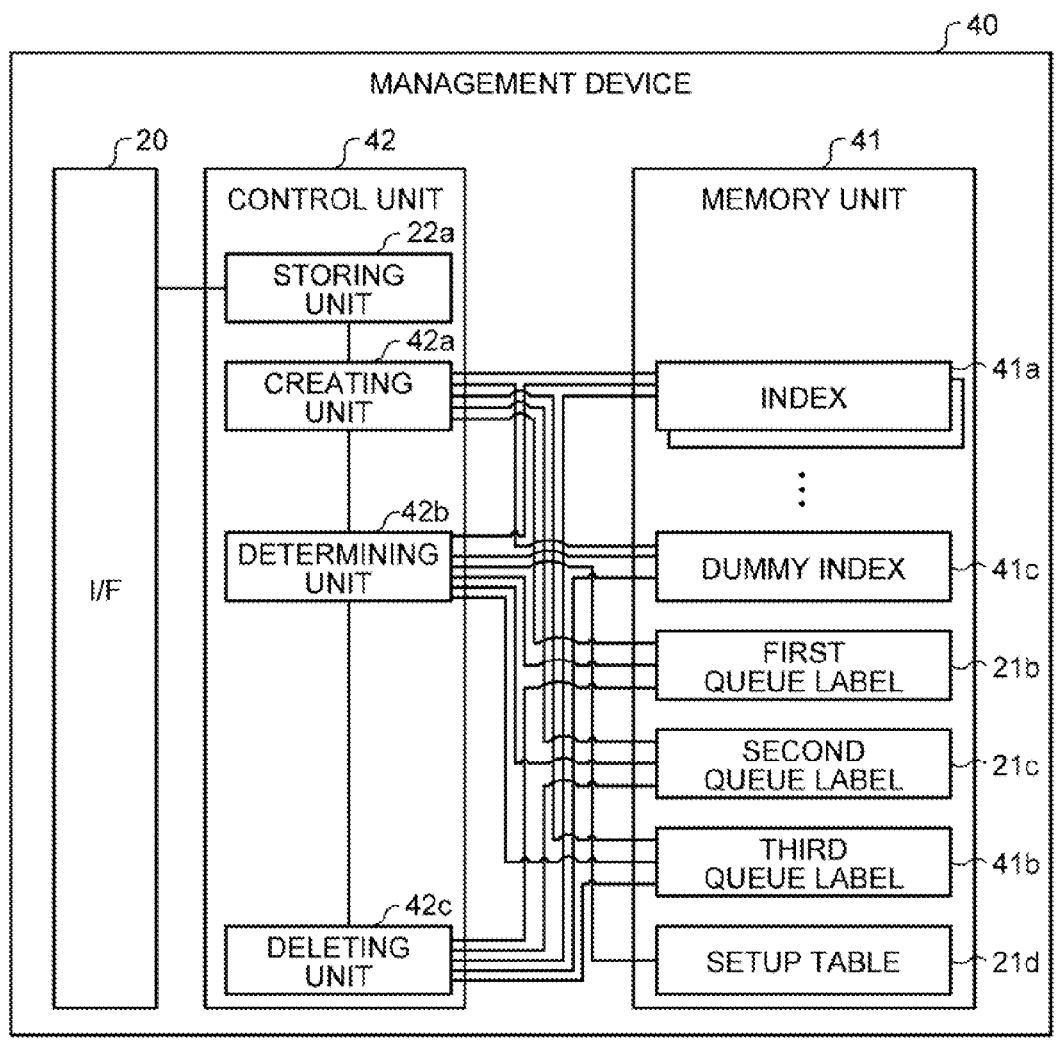
FIG. 28 is a block diagram illustrating the configuration of a management device according to the second embodiment.

FIG. 28 is a block diagram illustrating the configuration of a management device according to the second embodiment. As illustrated in FIG. 28, a management device 40 includes the I/F 20, a memory unit 41, and a control unit 42. When compared with the memory unit 21 according to the first embodiment illustrated in FIG. 7, the memory unit 41 differs in that it stores therein an index 41a and a third queue label 41b and also stores therein a dummy index 41c created by a creating unit 42a. Furthermore, when compared with the control unit 22 according to the first embodiment illustrated in FIG. 7, the control unit 42 differs in that it includes the creating unit 42a, a determining unit 42b, and a deleting unit 42c. In the following description, components having the same function as those in the first embodiment are assigned the same reference numerals illustrated in FIG. 7; therefore, a description thereof is omitted.

Figure 29:
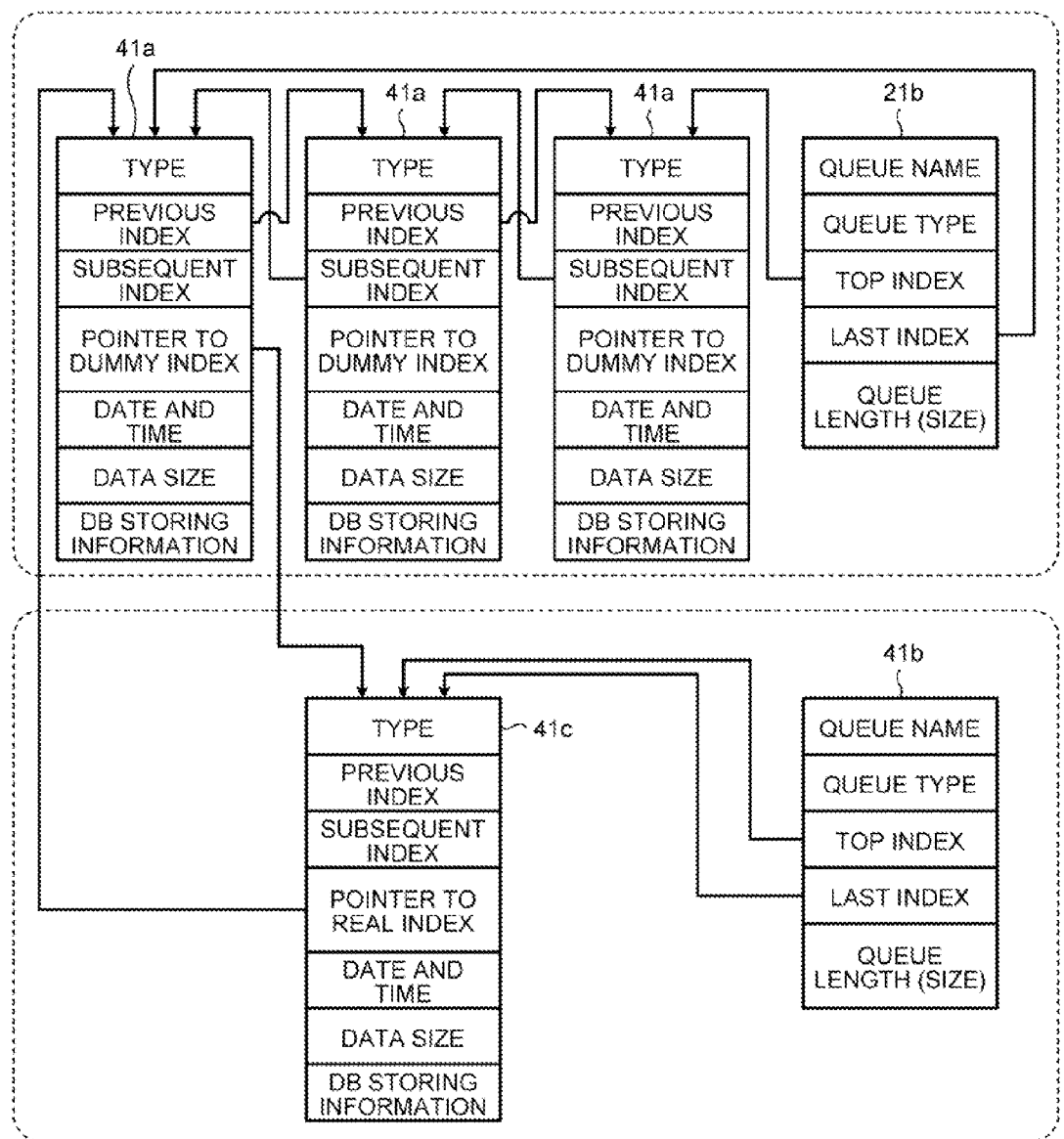
FIG. 29 is a schematic diagram illustrating an example of an index, a third queue label, and a dummy index according to the second embodiment.

FIG. 29 is a schematic diagram illustrating an example of an index, a third queue label, and a dummy index according to the second embodiment. As illustrated in FIG. 29, in addition to the data contained in the index 21a described above, the index 41a includes a "pointer to a dummy index" that indicates an address of a memory area in the memory unit 41 in which the dummy index 41c is stored.

Furthermore, as illustrated in FIG. 29, the third queue label 41b includes a "queue name" that indicates a queue name used to manage the retaining of unimportant data (not important data). Examples of unimportant data include measurement data that is transmitted from the server in the standby state or in the idle state. Furthermore, the third queue label 41b also includes a "queue type" indicating that the queue indicated by the third queue label 41b is a queue that is used to retain unimportant data. Furthermore, the third queue label 41b also includes a "top index" that indicates an address of a memory area in the memory unit 41 in which the dummy index 41c of the top data of the queue is stored. The top data of the queue mentioned here indicates the oldest data having the oldest "date and time" from among the data contained in the queue. Furthermore, the third queue label 41b also includes a "last index" that indicates an address of a memory area in the memory unit 41 in which the dummy index 41c of the last data of the queue is stored. The last data of the queue mentioned here indicates the latest data having the latest "date and time" from among the data contained in the queue. Furthermore, the third queue label 41b also includes a "queue length (size)" that indicates the sum of the size of data contained in the queue indicated by the third queue label 41b retained in the measurement data DB 16b.

The dummy index 41c includes a "type" that indicates the type of associated data. Furthermore, from among the dummy indexes 41c having the same data type, the dummy index 41c also includes a "previous index" that indicates an address, which is stored in a memory area in the memory unit 21, of the immediately previous dummy index 41c having the immediately previous "date and time" to the dummy index 41c. Furthermore, from among the dummy indexes 41c having the same data type, the dummy index 41c also includes a "subsequent index" that indicates an address, which is in a memory area in the memory unit 21, of the immediately subsequent dummy index 41c having the immediately subsequent "date and time" to the dummy index 41c. Furthermore, the dummy index 41c also includes a "pointer to a real index" that indicates an address of the associated index 41a. Furthermore, the dummy index 41c also includes the "date and time" that indicates the date at which a CPU containing the data is calculated or indicates the transmission date of the data. Furthermore, the dummy index 41c also includes the "data size" that indicates the size of the associated data. Furthermore, the dummy index 41c also includes "DB storing information" that indicates a sequence number of the measurement data DB 16b that retains data associated with the dummy index 41c.

The memory unit 41 is a semiconductor memory device, such as a flash memory or a memory device, such as a hard disk or an optical disk. The memory unit 41 is not limited to the memory device described above. For example, the memory unit 41 may also be a random access memory (RAM) or a read only memory (ROM).

In addition to the process performed by the creating unit 22b according to the first embodiment, the creating unit 42a performs the following process. Namely, the creating unit 42a creates and updates the index 41a described above by setting the address of the associated index 41a in the "pointer to a real index". Furthermore, the creating unit 42a updates the first queue label 21b, the second queue label 21c, and the third queue label 41b. For example, every time the creating unit 42a receives data that is transmitted from the network information collecting device 13 or the server information collecting device 14 via the I/F 20, the creating unit 42a creates the index 41a using various kinds of information contained in the received data in a similar manner performed by the creating unit 22b according to the first embodiment.

When receiving measurement data that is transmitted from a server in the standby state or in the idle state via the server information collecting device 14 and the I/F 20, the creating unit 42a creates the dummy index 41c that is managed by the associated third queue label 41b. The address of the associated index 41a is set in the "pointer to the real index" of the dummy index 41c. Furthermore, when receiving measurement data that is transmitted from a server in the standby state or in the idle state via the server information collecting device 14 and the I/F 20, the creating unit 42a sets, in the "pointer to a dummy index" of the index 41a, the address of the associated dummy index 41c. In this way, when receiving the measurement data that is transmitted from the server in the standby state or in the idle state, by setting the "pointer to the real index" and the "pointer to the dummy index", the creating unit 42a links the index 41a to the dummy index 41c. The creating unit 42a can recognizes the state of a server, i.e., the standby state or the idle state, in accordance with information on the state of the server received from the operation management device 15.

If an address is not set in the "top index" of the third queue label 41b, the creating unit 42a performs the following process. Namely, the creating unit 42a sets, in the "top index" of the third queue label 41b, an address of a memory area in the memory unit 41 in which the dummy index 41c of the top data of the queue indicated by the third queue label 41b is stored.

Furthermore, the creating unit 42a sets, in the "last index" of the third queue label 41b, an address of a memory area in the memory unit 41 in which the dummy index 41c of the last data of the queue indicated by the third queue label 41b is stored. Furthermore, the creating unit 42a calculates the sum of the size of data indicated by each dummy index 41c contained in a queue retained in the measurement data DB 16b and sets the calculated sum in the "queue length (size)" of the third queue label 41b.

In addition to the process performed by the determining unit 22c according to the first embodiment, the determining unit 42b performs the following process. For example, the determining unit 42b determines, at predetermined time intervals, whether the "queue length (size)" of the third queue label 41b exceeds its threshold. Accordingly, it is determined whether the size of unimportant data retained in the spare retention area has reached the threshold. The determining unit 42b calculates a spare retention area and then calculates a threshold by using a predetermined ratio. For example, when using a predetermined ratio of "the entire area of the spare retention area:the size of unimportant data=5:1", the determining unit 42b calculates, as a threshold, ⅕ of the spare retention area.

In addition to the process performed by the deleting unit 22d according to the first embodiment, the deleting unit 42c performs the following process. For example, the deleting unit 42c deletes, from the measurement data DB 16b, unimportant data that has reached its threshold in order to reduce the size of the unimportant data that has reached its threshold to a size smaller than the threshold. Specifically, the deleting unit 42c deletes unimportant data in chronological order such that the size of unimportant data becomes smaller than the threshold.

For example, if the determining unit 42b determines that the "queue length (size)" of the third queue label 41b exceeds its threshold, the deleting unit 42c performs the following process. Namely, the deleting unit 42c deletes, from the measurement data DB 16b, the data associated with the dummy index 41c indicated by the "top index" of the third queue label 41b. Specifically, the deleting unit 42c deletes, from the measurement data DB 16b, the data retained in the record having the sequence number indicated by the "DB storing information" contained in the dummy index 41c indicated by the "top index".

Furthermore, the deleting unit 42c subtracts the "data size" of the dummy index 41c indicated by the "top index" of the third queue label 41b from the "queue length (size)" of the third queue label 41b. The reason for performing the subtraction is that the dummy index 41c indicated by the "top index"

is virtually extracted from the virtual queue indicated by the third queue label 41b, which will be described later.

Furthermore, the deleting unit 42c deletes, from the memory unit 21, the dummy index 41c indicated by the "top index" of the third queue label 41b. Accordingly, the dummy index 41c indicated by the "top index" is virtually extracted from the virtual queue indicated by the third queue label 41b.

Furthermore, the deleting unit 42c performs the following process by using the address of the dummy index 41c of the top data contained in the queue indicated by the third queue label 41b. Namely, the deleting unit 42c sets the address in the "top index" of the third queue label 41b. The reason for resetting that address in the "top index" of the third queue label 41b in this way is that the dummy index 41c is virtually extracted from the queue and the top dummy index 41c contained in the queue is changed.

The control unit 42 is an integrated circuit, such as an application specific integrated circuit (ASIC) or a field programmable gate array (FPGA), or is an electronic circuit, such as a central processing unit (CPU) or a micro processing unit (MPU).

Figure 30:
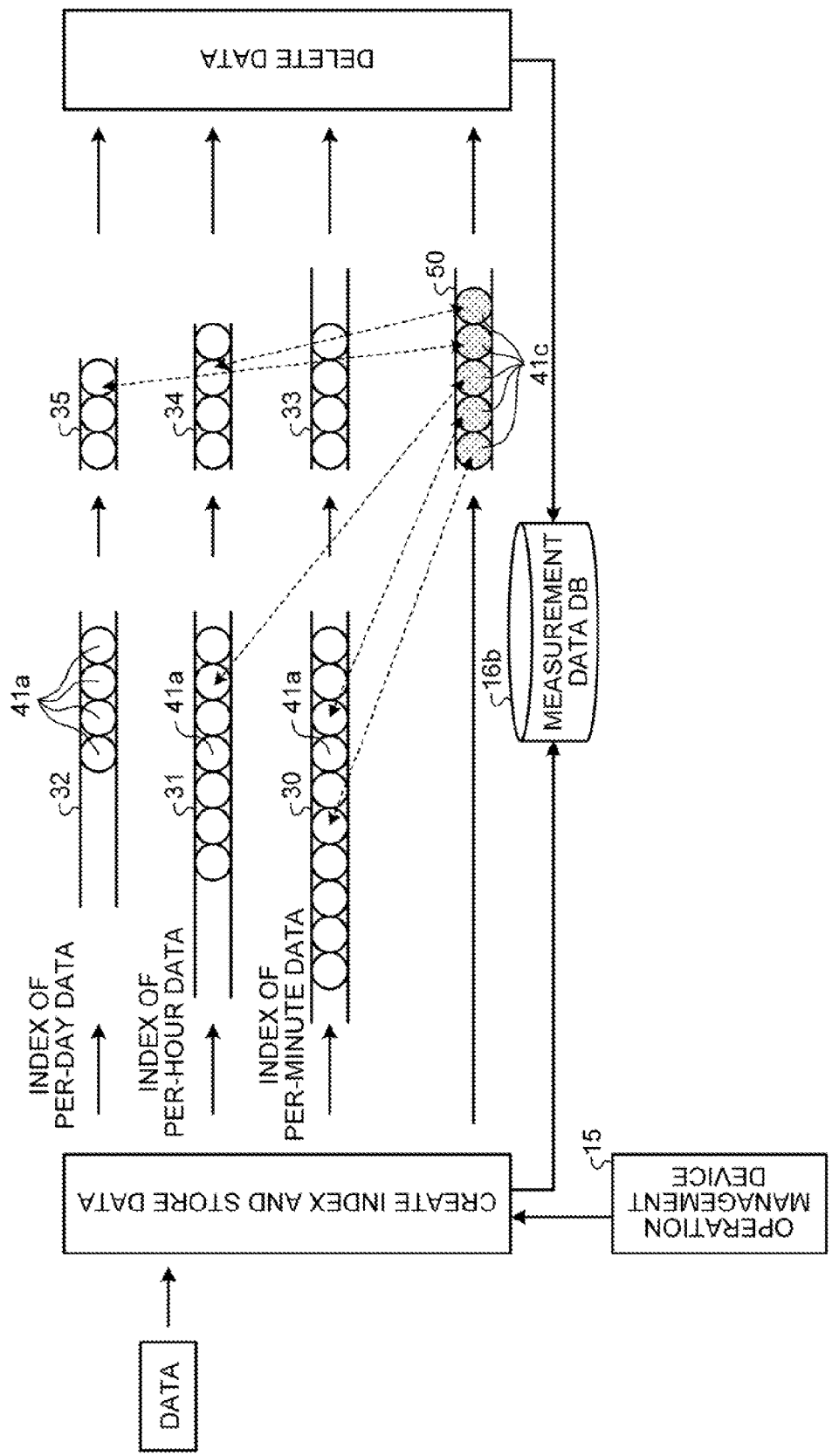
FIG. 30 is a schematic diagram illustrating an example of the operation of the management device.

In the following, an example of the operation of the management device 40 will be described. FIG. 30 is a schematic diagram illustrating an example of the operation of the management device. As illustrated in FIG. 30, when receiving data from the network information collecting device 13 and the server information collecting device 14, the management device 40 stores the received data in the measurement data DB 16b. Furthermore, if the type of the received data is the "per-minute data", the management device 40 virtually stores the index 41a in the virtual queue 30 indicated by the first queue label 21b associated with the "per-minute data". Furthermore, if the type of the received data is the "per-hour data", the management device 40 virtually stores the index 41a in the virtual queue 31 indicated by the first queue label 21b associated with the "per-hour data". Furthermore, if the type of the received data is the "per-day data", the management device 40 virtually stores the index 41a in the virtual queue 32 indicated by the first queue label 21b associated with the "per-day data". Furthermore, if the received data is unimportant data, the management device 40 virtually stores the dummy index 41c that is linked to the index 41a in the virtual queue 50 indicated by the received the third queue label 41b.

Then, as illustrated in FIG. 30, if a predetermined time period, for example, three months, has elapsed for a retention period of the index 41a of the queue 30, the management device 40 virtually extracts the index 41a from the queue 30. Furthermore, if a predetermined time period, for example, one year, has elapsed for a retention period of the index 41a of the queue 31, the management device 40 virtually extracts the index 41a from the queue 31. Furthermore, if a predetermined time period, for example, three years, has elapsed for a retention period of the index 41a of the queue 32, the management device 40 virtually extracts the index 41a from the queue 32.

Then, the management device 40 virtually stores the index 41a extracted from the queue 30 in the virtual queue 33 indicated by the second queue label 21c associated with the "per-minute data". Furthermore, the management device 40 virtual stores the index 41a extracted from the queue 31 in the virtual queue 34 indicated by the second queue label 21c associated with the "per-hour data". Furthermore, the management device 40 virtually stores the index 41a extracted from the queue 32 in the virtual queue 35 indicated by the second queue label 21c associated with the "per-day data".

Then, if the sum of the size of the data indicated by the index 41a contained in the queue 33 has reached its threshold, the management device 40 virtually extracts the index 41a from the queue 33. Furthermore, if the sum of the size of the data indicated by the index 41a contained in the queue 34 has reached its threshold, the management device 40 virtually extracts the index 41a from the queue 34. Furthermore, if the sum of the size of the data indicated by the index 41a contained in the queue 35 has reached its threshold, the management device 40 virtually extracts the index 41a from the queue 35. Then, the management device 40 deletes the data associated with the extracted index 41a from the measurement data DB 16b.

Furthermore, if the sum of the size of data indicated by the dummy index 41c of the queue 50 has reached its threshold, the management device 40 virtually extracts the dummy index 41c from the queue 50. Then, the management device 40 deletes the data associated with the extracted dummy index 41c from the measurement data DB 16b.

As described above, the management device 40 according to the second embodiment can use the entire memory area in the measurement data DB 16b in order to retain various data. In other words, the management device 40 according to the second embodiment also uses a spare retention area when retaining various data. Accordingly, the management device 40 according to the second embodiment can effectively use the spare retention area.

Furthermore, because the measurement data that is transmitted from a server in the standby state or in the idle state is not important data, the management device 40 according to the second embodiment deletes the measurement data from the measurement data DB 16b even if the size of the measurement data has not reached its threshold. Accordingly, the management device 40 according to the second embodiment deletes, with priority, unimportant data whose importance is low.

Flow of a Process

Figure 31:
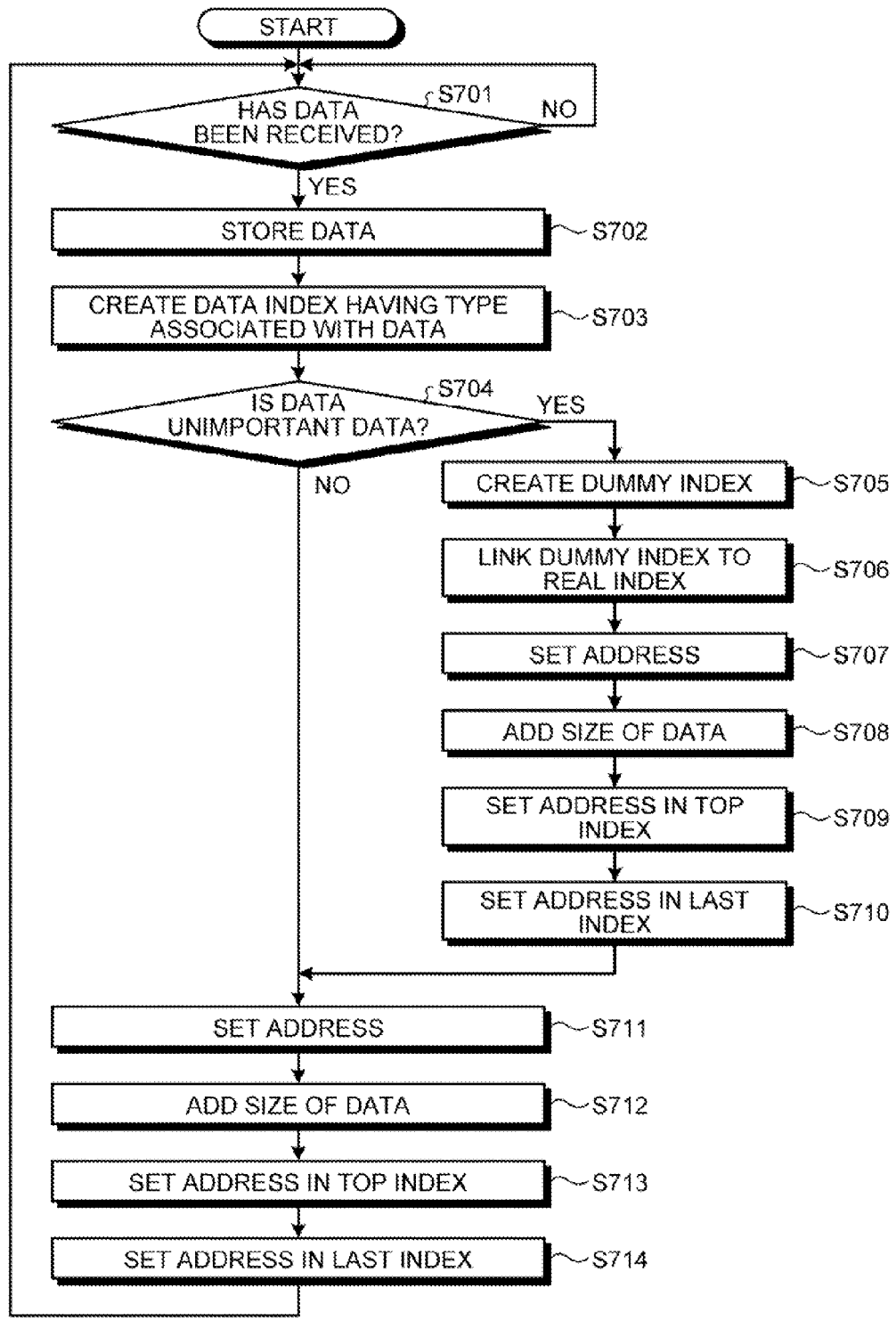
FIG. 31 is a flowchart illustrating the flow of a storing process according to the second embodiment.
Figure 32:
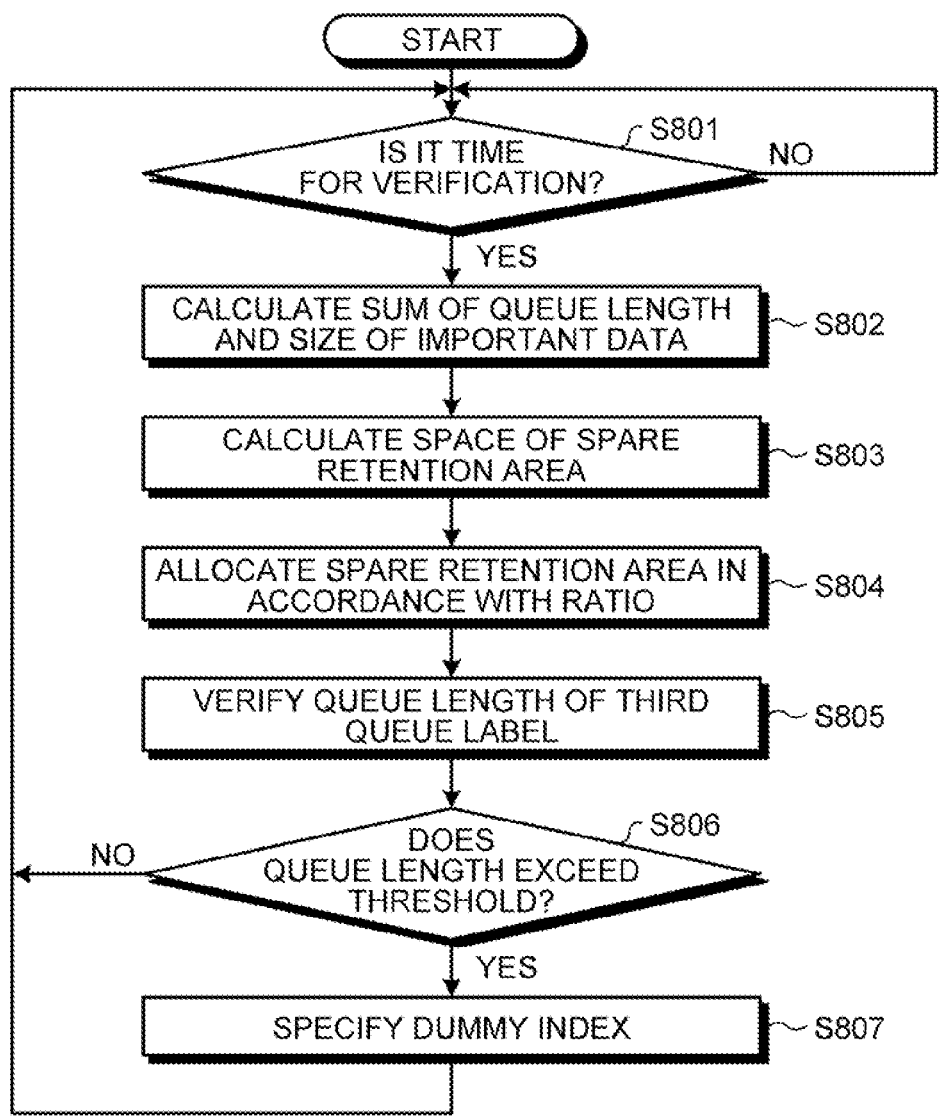
FIG. 32 is a flowchart illustrating the flow of a third determining process according to the second embodiment.
Figure 33:
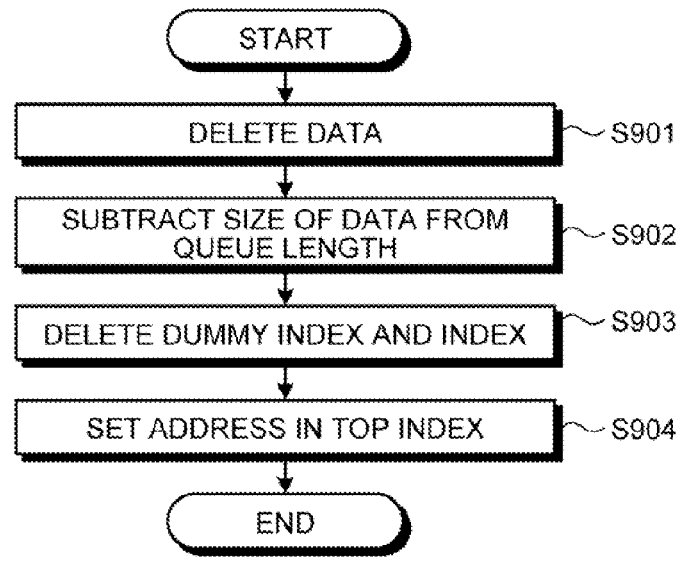
FIG. 33 is a flowchart illustrating the flow of a deleting process according to the second embodiment.

In the following, a process performed by the management device 40 according to the second embodiment will be described. The processes described with reference to FIGS. 31 to 33 are individually performed. In the second embodiment, the same processes performed described with reference to FIGS. 23 to 27 are performed; therefore, a description thereof will be omitted here. FIG. 31 is a flowchart illustrating the flow of a storing process according to the second embodiment. The storing process is repeatedly performed for a period of time during which the power supply of the management device 40 is turned on.

As illustrated in FIG. 31, when receiving data transmitted from the network information collecting device 13 or the server information collecting device 14 via the I/F 20 (Yes at Step S701), the storing unit 22a stores the received data in the measurement data DB 16b (Step S702). The creating unit 42a creates the index 41a using various kinds of information contained in the received data (Step S703).

The creating unit 42a determines whether the received data is unimportant data (Step S704). If the received data is unimportant data (Yes at Step S704), the creating unit 42a creates the dummy index 41c (Step S705). The creating unit 42a sets, in the "pointer to the real index" of the dummy index 41c, an address associated with the index 41a and sets, in the "pointer to the dummy index" of the index 41a, an address associated with the dummy index 41c (Step S706).

The creating unit 42a sets an address of a new dummy index 41c in the "subsequent index" contained in the immediately previous dummy index 41c having the immediately previous "date and time" to the new created dummy index 41c (Step S707). The creating unit 42a calculates the sum of the size of the data that is indicated by each dummy index 41c contained in a queue and that is retained in the measurement data DB 16*b* and sets the calculated sum in the "queue length (size)" of the third queue label 41*b* (Step S708). The creating unit 42*a* sets, in the "top index" of the third queue label 41*b*, the address of the memory area in the memory unit 41 in which the dummy index 41*c* of the top data of the queue indicated by the third queue label 41*b* is stored (Step S709). If the address is set in the "top index" of the third queue label 41*b*, the process performed at Step S709 can be omitted. The creating unit 42*a* sets, in the "last index" of the third queue label 41*b*, the address of the memory area in the memory unit 41 in which the dummy index 41*c* of the last data contained in the queue indicated by the third queue label 41*b* (Step S710).

The creating unit 42*a* sets an address of a new index 41*a* in the "subsequent index" contained in the immediately previous index 41*a* that has the same "data type" as that of the new created index 41*a* and that has the immediately previous "date and time" to the new index 41*a* (Step S711). The creating unit 42*a* calculates the sum of the size of the data that is indicated by each index 41*a* contained in the queue and is retained in the measurement data DB 16*b* and sets the calculated sum in the "queue length (size)" of the first queue label 21*b* (Step S712).

The creating unit 42*a* sets, in the "top index" of the first queue label 21*b*, the address of the memory area in the memory unit 21 in which the index 41*a* of the top data of the queue indicated by the first queue label 21*b* is stored (Step S713). If the address is set in the "top index" of the first queue label 21*b*, the process performed at Step S713 can be omitted. The creating unit 42*a* sets, in the "last index" of the first queue label 21*b*, the address of the memory area in the memory unit 41 in which the index 41*a* of the last data contained in the queue indicated by the first queue label 21*b* is stored (Step S714). Then, the process returns to Step S701. In contrast, if the received data is not unimportant data (No at Step S704), the process proceeds to Step S711.

FIG. 32 is a flowchart illustrating the flow of a third determining process according to the second embodiment. The third determining process is performed for a period of time during which the power supply of the management device 40 is turned on.

As illustrated in FIG. 32, the determining unit 42*b* determines whether the current time is the time at which the verification is performed (Step S801). Examples of the time at which the verification is performed at predetermined time intervals, for example, at intervals of one minute.

If the current time is the time at which the verification is performed (Yes at Step S801), the determining unit 42*b* performs the following process. The determining unit 42*b* calculates the sum of the "queue length" of the first queue label 21*b* associated with the per-minute data, the per-hour data, and the per-day data and the data size of the "important data" (Step S802).

The determining unit 42*b* subtracts the sum calculated at Step S802 from the total storage capacity of the measurement data DB 16*b* to calculates the space of the spare retention area (Step S803). The determining unit 42*b* allocates, in accordance with a predetermined ratio, the space of the spare retention area to unimportant data (Step S804). The space of the spare retention area allocated to the unimportant data corresponds to the threshold the size of unimportant data.

The determining unit 42*b* verifies the "queue length" of the third queue label 41*b* (Step S805). The determining unit 42*b* determines whether the verified "queue length" exceeds its threshold (Step S806). If the verified "queue length" does not exceed the threshold (No at Step S806), the process returns to Step S801. In contrast, the verified "queue length" exceeds the threshold (Yes at Step S806), the determining unit 42*b* performs the following process. Namely, the determining unit 42*b* specifies the top dummy index 41*c* of the third queue label 41*b* and stores the specified dummy index 41*c* in an internal memory in the control unit 42 (Step S807). Then, the process returns to Step S801.

FIG. 33 is a flowchart illustrating the flow of a deleting process according to the second embodiment. The deleting process is performed every time the dummy index 41*c* is specified at Step S807 described above.

As illustrated in FIG. 33, the deleting unit 42*c* deletes, from the measurement data DB 16*b*, the data retained in the record having the sequence number indicated by the "DB storing information" contained in the specified dummy index 41*c* (Step S901). The deleting unit 42*c* subtracts the "data size" of the specified dummy index 41*c* from the "queue length (size)" associated with the third queue label 41*b* (Step S902).

The deleting unit 42*c* deletes, from the memory unit 41, the specified dummy index 41*c* and the index 41*a* that is linked to the dummy index 41*c* (Step S903). The deleting unit 42*c* performs the following process by using the address of the dummy index 41*c* of the top data contained in the queue indicated by the third queue label 41*b*. Namely, the deleting unit 42*c* sets the address in the "top index" of the third queue label 41*b* (Step S904) and ends the process.

Advantage of the Second Embodiment

As described above, the management device 40 according to the second embodiment can use the entire memory area of the measurement data DB 16*b* in order to retain various data. In other words, the management device 40 according to the second embodiment also uses a spare retention area when retaining the various data. Accordingly, the management device 40 according to the second embodiment can effectively use the spare retention area.

Furthermore, because the measurement data transmitted from a server in the standby state or in the idle state is not important data, the management device 40 according to the second embodiment deletes the measurement data from the measurement data DB 16*b* even if the size of the measurement data has not reached its threshold. Accordingly, the management device 40 according to the second embodiment deletes, with priority, unimportant data whose importance is low.

In the above explanation, the embodiments of the present invention have been described; however, the present invention can be implemented with various kinds of embodiments other than the embodiments described above. Therefore, another embodiment included in the present invention will be described below.

For example, of the processes described in the first and second embodiments, the whole or a part of the processes that are mentioned as being automatically performed can also be manually performed. For example, an administrator may also input an instruction to execute each process via an operation receiving device, which is not illustrated.

Furthermore, in accordance with various loads or the operation state, processes performed at each Step described in the first and second embodiments may also arbitrarily be separated or be integrated each other. Furthermore, some Step may also be omitted. For example, Steps S502 and S503 illustrated in FIG. 26 may also be integrated. Furthermore, Steps S802 and S803 illustrated in FIG. 32 may also be integrated.

Furthermore, in accordance with various loads or use conditions, it is also possible to change the order of processes performed at each Step described in the first and second embodiments. For example, before performing the process at Step S210 illustrated in FIG. 23, the process at Step S211 may also be performed. Furthermore, before performing the process at Step S310 illustrated in FIG. 24, the process at Step S311 may also be performed. Furthermore, before performing the process at Step S410 illustrated in FIG. 25, the process at Step S411 may also be performed.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device can be configured by functionally or physically separating or integrating any of the units depending on various loads or use conditions. For example, the creating unit 22b and the determining unit 22c illustrated in FIG. 7 may be integrated. Furthermore, the creating unit 42a and the determining unit 42b illustrated in FIG. 28 may also be integrated.

Management Program

The various processes performed by the management device described in the first and second embodiments can be implemented by programs prepared in advance and executed by a computer system such as a personal computer or a workstation. Accordingly, in the following, a computer that executes a management program having the same function performed by the management device described in the first embodiment will be described as an example with reference to FIG. 34. Furthermore, a computer that executes a management program having the same function performed by the management device described in the second embodiment will be described as an example with reference to FIG. 35.

[c] Third Embodiment

Figure 34:
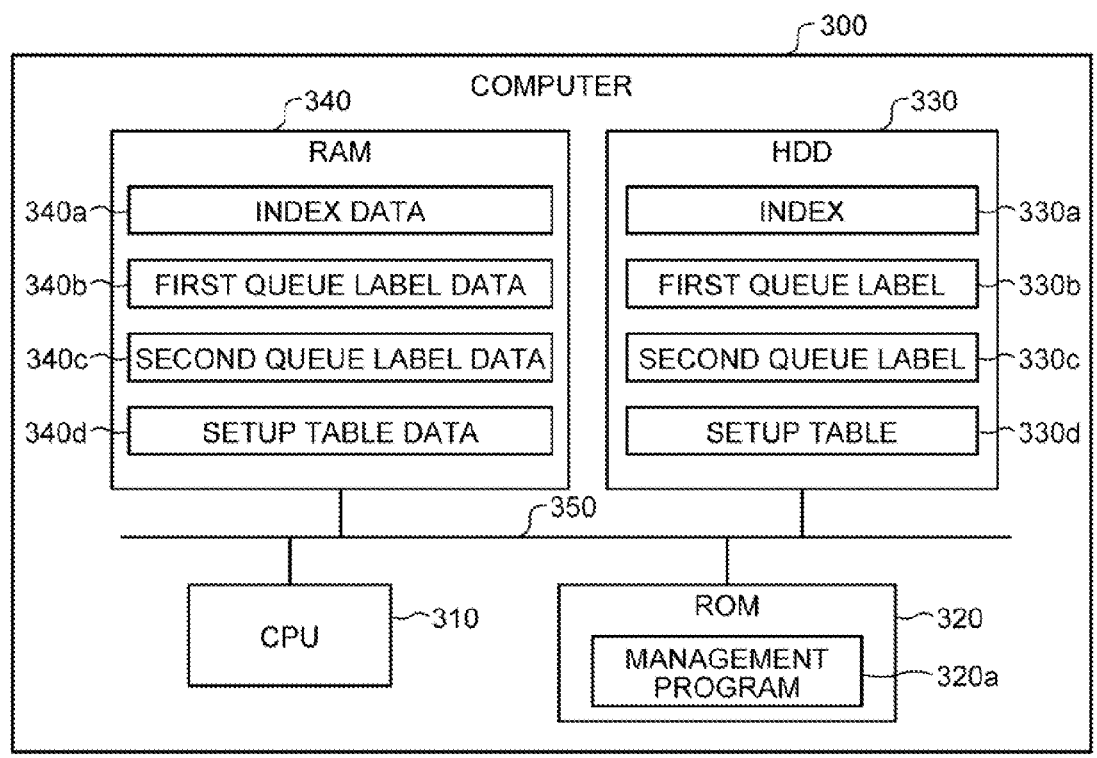
FIG. 34 is a block diagram illustrating a computer that executes a management program.

FIG. 34 is a block diagram illustrating a computer that executes a management program. As illustrated in FIG. 34, a computer 300 according to a third embodiment includes a central processing unit (CPU) 310, a read only memory (ROM) 320, a hard disk drive (HDD) 330, and a random access memory (RAM) 340, which are connected via a bus 350.

The ROM 320 stores therein, in advance, a management program 320a having the same function as that performed by the storing unit 22a, the creating unit 22b, the determining unit 22c, and the deleting unit 22d described in the first embodiment. The management program 320a may appropriately be divided. For example, the management program 320a may be divided into a program having the same function as that performed by the storing unit 22a, the determining unit 22c, and the deleting unit 22d and a program having the same function as that performed by the creating unit 22b.

Then, the CPU 310 reads and executes the management program 320a from the ROM 320.

The HDD 330 stores therein an index 330a, a first queue label 330b, a second queue label 330c, and a setup table 330d. The index 330a, the first queue label 330b, the second queue label 330c, and the setup table 330d correspond to the index 21a, the first queue label 21b, the second queue label 21c, and the setup table 21d, respectively, illustrated in FIG. 7.

Then, the CPU 310 reads the index 330a, the first queue label 330b, the second queue label 330c, and the setup table 330d and stores them in the RAM 340. Furthermore, by using index data 340a, first queue label data 340b, second queue label data 340c, and setup table data 340d stored in the RAM 340, the CPU 310 executes the management program. For the data to be stored in the RAM 340, not all of the data is needed to be stored in the RAM 340 as long as data needed to be processed is stored in the RAM 340.

[d] Fourth Embodiment

Figure 35:
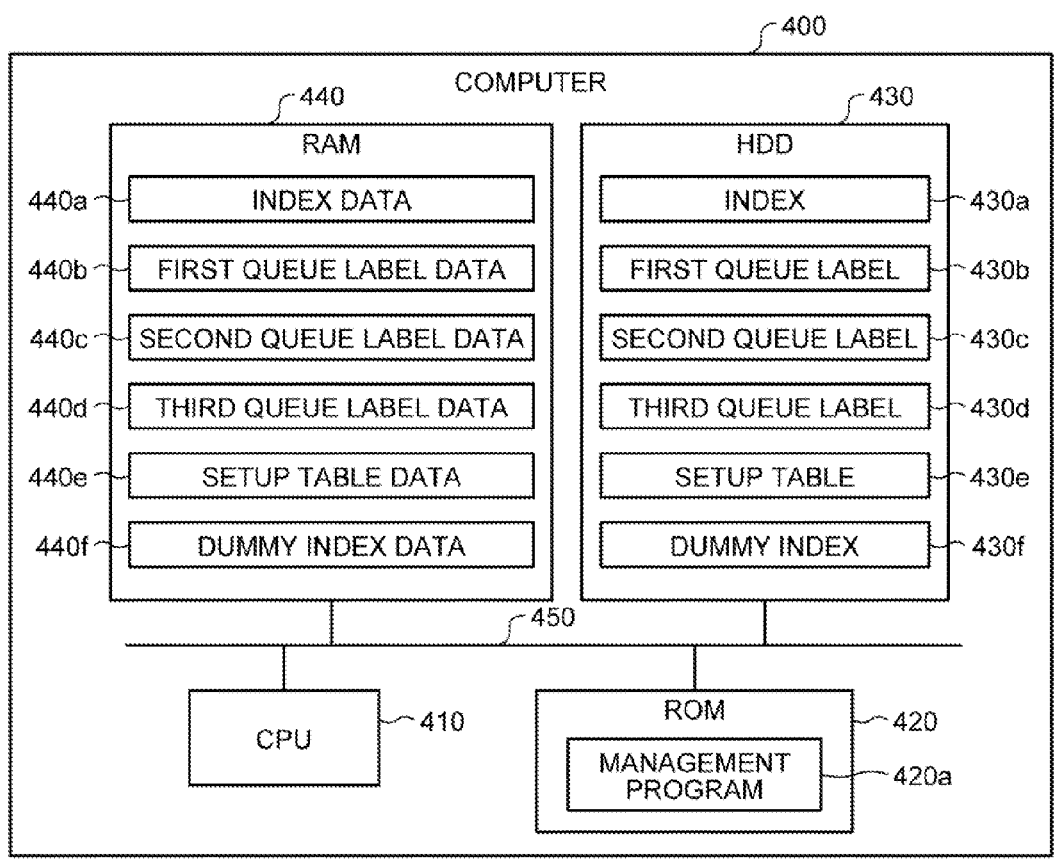
FIG. 35 is a block diagram illustrating a computer that executes a management program.
Figure 36:
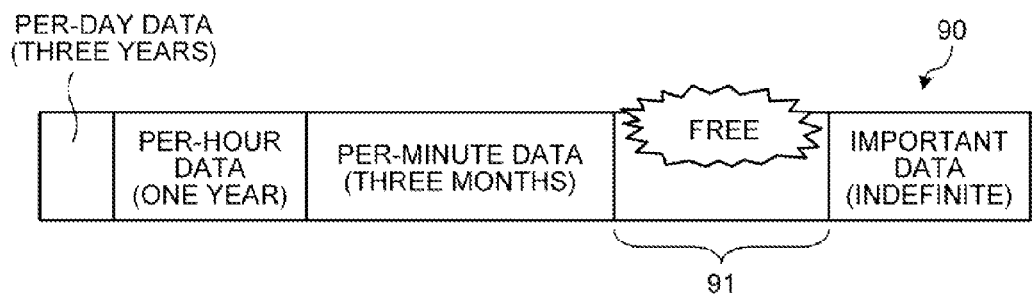
FIG. 36 is a schematic diagram illustrating a problem with the conventional technology.
Figure 37:
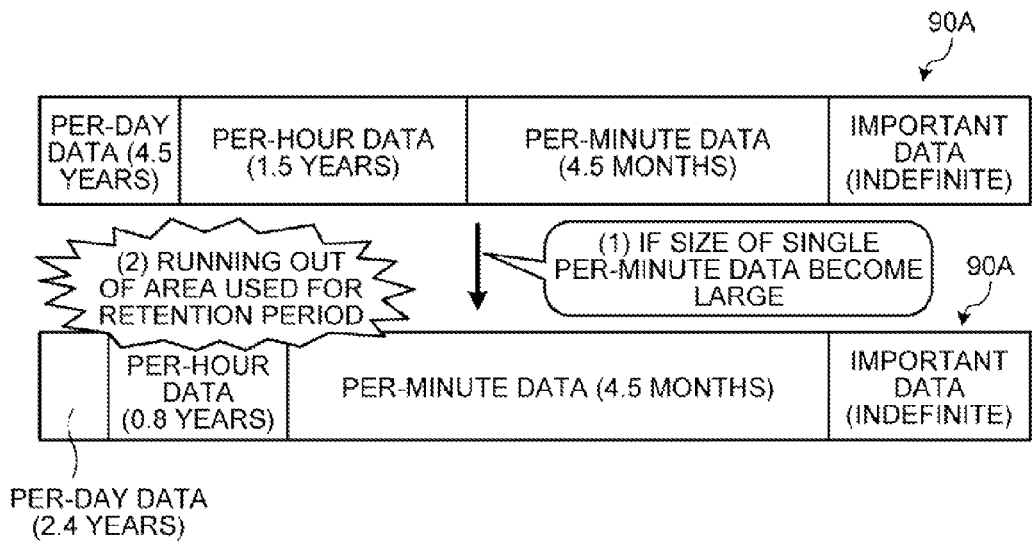
FIG. 37 is a schematic diagram illustrating a problem occurring when the entire memory area of a database is shared by each measurement data and each of the measurement data is retained in each region.

FIG. 35 is a block diagram illustrating a computer that executes a management program. As illustrated in FIG. 35, a computer 400 according to a fourth embodiment includes a CPU 410, a ROM 420, an HDD 430, and a RAM 440, which are connected via a bus 450.

The ROM 420 stores therein, in advance, a management program 420a having the same function as that performed by the storing unit 22a, the creating unit 42a, the determining unit 42b, and the deleting unit 42c described in the second embodiment. The management program 420a may appropriately be divided. For example, the management program 420a may be divided into a program having the same function as that performed by the storing unit 22a, the determining unit 42b, and the deleting unit 42c and a program having the same function performed by the creating unit 42a.

Then, the CPU 410 reads and executes the management program 420a from the ROM 420.

The HDD 430 stores therein an index 430a, a first queue label 430b, a second queue label 430c, a third queue label 430d, a setup table 430e, and a dummy index 430f. The index 430a corresponds to the index 41a illustrated in FIG. 28. The first queue label 430b, the second queue label 430c, and the third queue label 430d correspond to the first queue label 21b, the second queue label 21c, and the third queue label 41b, respectively, illustrated in FIG. 28. The setup table 430e and the dummy index 430f correspond to the setup table 21d and the dummy index 41c, respectively, illustrated in FIG. 28.

Then, the CPU 410 reads the index 430a, the first queue label 430b, the second queue label 430c, the third queue label 430d, the setup table 430e, and the dummy index 430f and stores them in the RAM 440. Furthermore, the CPU 410 executes the management program by using data that is stored in the RAM 440 and that will be described below. Namely, the CPU 410 uses index data 440a, first queue label data 440b, second queue label data 440c, third queue label data 440d, setup table data 440e, and dummy index data 440f. For the data to be stored in the RAM 440, not all of the data is needed to be stored in the RAM 440 as long as data needed to be processed is stored in the RAM 440.

The management programs described above each do not need to be stored in the ROM 320 or 420 from the beginning. For example, each of the management programs is stored in a "portable physical medium", such as a flexible disk (FD), a CD-ROM, a DVD disk, a magneto-optic disk, an IC CARD, or the like that can be inserted into the computer 300 or 400. Then, the computers 300 and 400 each may read and execute the management program from the flexible disk or the like described above.

Alternatively, the management programs each may also be stored in "another computer (or a server)" connected to the computer 300 or 400 via a public circuit, the Internet, a LAN, or a WAN. Then, the computers 300 and 400 each may read and execute the program from the other computer described above.

According to an aspect of the present invention, a spare retention area can be effectively used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
    a storing unit that stores data in a database, each of the data being categorized in one of a plurality of data sets by data type of the each of the data, being accumulated thereto periodically by specified time period related to the data type, and being stored in the database for at least a specified retention period related to the data type;
    a determining unit that determines, when an elapsed part of a first data set included in the plurality of data sets has been stored for more than a first retention period related to the first data set, whether a size of the elapsed part of the first data set exceeds a threshold specified for the first data set, the threshold being calculated using a spare storage capacity and a ratio specified for the first data set, wherein the spare storage capacity is calculated by subtracting a size of unelapsed part of the first data set and sum of sizes of unelapsed parts of other data sets from a storage capacity of the database, the other data sets being the plurality of data sets excluding the first data set; and
    a deleting unit that deletes, when the determining unit determines that the size exceeds the threshold, the elapsed part of the first data set from the database.

2. The management device according to claim 1, wherein, when data is transmitted from a device that is in a predetermined operation state, even before the determining unit determines that the size of the elapsed part exceeds the threshold, the deleting unit deletes the data from the database that stores therein the data.

3. A management device including:
    a processor; and
    a memory, wherein the processor executes:
    storing data in a database, each of the data being categorized in one of a plurality of data sets by data type of the each of the data, being accumulated thereto periodically by specified time period related to the data type, and being stored in the database for at least a retention period related to the data type;
    determining, when an elapsed part of a first data set included in the plurality of data sets has been stored for more than a first retention period related to the first data set, whether a size of the elapsed part of the first data set exceeds a threshold specified for the first data set, the threshold being calculated using a spare storage capacity and a ratio specified for the first data set, wherein the spare storage capacity is calculated by subtracting a size of unelapsed part of the first data set and sum of sizes of unelapsed parts of other data sets from a storage capacity of the database, the other data sets being the plurality of data sets excluding the first data set; and
    deleting, when determining that the size exceeds the threshold, the elapsed part of the first data set from the database.

4. A non-transitory computer readable storage medium storing therein a management program causing a computer to execute a process comprising:
    storing data in a database, each of the data being categorized in one of a plurality of data sets by data type of the each of the data, being accumulated thereto periodically by specified time period related to the data type, and being stored in the database for at least a retention period related to the data type;
    determining, when an elapsed part of a first data set included in the plurality of data sets has been stored for more than a first retention period related to the first data set, whether a size of the elapsed part of the first data set exceeds a threshold specified for the first data set, the threshold being calculated using a spare storage capacity and a ratio specified for the first data set, wherein the spare storage capacity is calculated by subtracting a size of unelapsed part of the first data set and sum of sizes of unelapsed parts of other data sets from a storage capacity of the database, the other data sets being the plurality of data sets excluding the first data set; and
    deleting, when determining that the size exceeds the threshold, the elapsed part of the first data set from the database.

5. The non-transitory computer readable storage medium storing therein the management program according to claim 4, wherein, when data is transmitted from a device that is in a predetermined operation state, even before the determining determines that the size of the elapsed part exceeds the threshold, the deleting deletes the data from the database that stores therein the data.

6. A management method executed by a computer, the management method comprising:
    storing data in a database, each of the data being categorized in one of a plurality of data sets by data type of the each of the data, being accumulated thereto periodically by specified time period related to the data type, and being stored in the database for at least a retention period related to the data type;
    determining, when an elapsed part of a first data set included in the plurality of data sets has been stored for more than a first retention period related to the first data set, whether a size of the elapsed part of the first data set exceeds a threshold specified for the first data set, the threshold being calculated using a spare storage capacity and a ratio specified for the first data set, wherein the spare storage capacity is calculated by subtracting a size of unelapsed part of the first data set and sum of sizes of unelapsed parts of other data sets from a storage capacity of the database, the other data sets being the plurality of data sets excluding the first data set; and
    deleting, when determining that the size exceeds the threshold, the elapsed part of the first data set from the database.

7. The management method according to claim 6, wherein when data is transmitted from a device that is in a predetermined operation state, even before the determining determines that the size of the elapsed part exceeds the threshold, the deleting deletes the data from the database that stores therein the data.

* * * * *